United States Patent
Nakajima et al.

(10) Patent No.: US 10,892,513 B2
(45) Date of Patent: Jan. 12, 2021

(54) NONAQUEOUS ELECTROLYTE SECONDARY BATTERY

(71) Applicant: GS Yuasa International Ltd., Kyoto (JP)

(72) Inventors: Kaname Nakajima, Kyoto (JP); Heisuke Nishikawa, Kyoto (JP); Shuji Hitomi, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 218 days.

(21) Appl. No.: 15/766,677

(22) PCT Filed: Sep. 30, 2016

(86) PCT No.: PCT/JP2016/004424
§ 371 (c)(1),
(2) Date: Apr. 6, 2018

(87) PCT Pub. No.: WO2017/064842
PCT Pub. Date: Apr. 20, 2017

(65) Prior Publication Data
US 2018/0287120 A1    Oct. 4, 2018

(30) Foreign Application Priority Data

Oct. 14, 2015  (JP) .................................. 2015-202630
Nov. 6, 2015   (JP) .................................. 2015-218141
Jun. 1, 2016   (JP) .................................. 2016-109738

(51) Int. Cl.
*H01M 10/04* (2006.01)
*H01M 2/16* (2006.01)
(Continued)

(52) U.S. Cl.
CPC .......... *H01M 10/045* (2013.01); *H01M 2/16* (2013.01); *H01M 2/1653* (2013.01);
(Continued)

(58) Field of Classification Search
None
See application file for complete search history.

(56) References Cited

U.S. PATENT DOCUMENTS

| 4,707,422 A | 11/1987 | Neufville et al. |
| 6,030,720 A | 2/2000 | Chu et al. |

(Continued)

FOREIGN PATENT DOCUMENTS

| CN | 103068473 A | 4/2013 |
| JP | H08130034 A | 5/1996 |

(Continued)

OTHER PUBLICATIONS

Extended European Search Report (EESR) dated Apr. 25, 209 issued in the corresponding European patent application No. 16855098.6.

(Continued)

*Primary Examiner* — Tracy M Dove
(74) *Attorney, Agent, or Firm* — Rankin, Hill & Clark LLP

(57) ABSTRACT

One aspect of the present invention provides a nonaqueous electrolyte secondary battery including a sulfur-containing positive electrode, a negative electrode, a cation exchange resin layer interposed between the positive electrode and the negative electrode, a positive electrode electrolyte, and a negative electrode electrolyte. The positive electrode electrolyte contains lithium polysulfide, and a sulfur equivalent concentration of the positive electrode electrolyte is higher than the sulfur equivalent concentration of the negative electrode electrolyte. Another aspect of the present invention provides a nonaqueous electrolyte secondary battery including a sulfur-containing positive electrode, a negative electrode, a cation exchange resin layer interposed between the positive electrode and the negative electrode, and a nonaqueous electrolyte. At least one of the positive electrode (Continued)

and the negative electrode includes a cation exchange resin, and a concentration of an anion contained in the nonaqueous electrolyte is 0.7 mol/l or less.

11 Claims, 7 Drawing Sheets

(51) Int. Cl.
| | |
|---|---|
| *H01M 4/58* | (2010.01) |
| *H01M 10/0568* | (2010.01) |
| *H01M 10/058* | (2010.01) |
| *H01M 10/0567* | (2010.01) |
| *H01M 10/052* | (2010.01) |
| *H01M 10/0525* | (2010.01) |
| *H01M 10/0561* | (2010.01) |
| *H01M 4/02* | (2006.01) |

(52) U.S. Cl.
CPC ........... *H01M 2/1673* (2013.01); *H01M 4/58* (2013.01); *H01M 4/5815* (2013.01); *H01M 10/049* (2013.01); *H01M 10/052* (2013.01); *H01M 10/058* (2013.01); *H01M 10/0525* (2013.01); *H01M 10/0561* (2013.01); *H01M 10/0567* (2013.01); *H01M 10/0568* (2013.01); *H01M 2004/028* (2013.01); *H01M 2300/0017* (2013.01); *H01M 2300/0037* (2013.01); *Y02E 60/10* (2013.01); *Y02T 10/70* (2013.01)

(56) References Cited

U.S. PATENT DOCUMENTS

| | | | |
|---|---|---|---|
| 6,949,318 | B2 | 9/2005 | Choi |
| 9,093,710 | B2 | 7/2015 | Kourtakis |
| 2002/0045101 | A1 | 4/2002 | Jung |
| 2013/0146450 | A1 | 6/2013 | Kishino et al. |
| 2013/0183550 | A1 | 7/2013 | Kourtakis |
| 2013/0224550 | A1 | 8/2013 | Smart |
| 2015/0140360 | A1 | 5/2015 | Kourtakis |
| 2015/0171469 | A1 | 6/2015 | Kourtakis et al. |
| 2015/0188109 | A1 | 7/2015 | Kim et al. |
| 2015/0249244 | A1 | 9/2015 | Brüeckner |
| 2016/0285135 | A1 | 9/2016 | Murakami |

FOREIGN PATENT DOCUMENTS

| | | |
|---|---|---|
| JP | H11339808 A | 12/1999 |
| JP | 2000215916 A | 8/2000 |
| JP | 2001200079 A | 7/2001 |
| JP | 2002083633 A | 3/2002 |
| JP | 2003017128 A | 1/2003 |
| JP | 2008152985 A | 7/2008 |
| JP | 2010-192385 A | 9/2010 |
| JP | 2010192385 A | 9/2010 |
| JP | 2015507837 A | 3/2015 |
| JP | 2015511391 A | 4/2015 |
| JP | 2015128063 A | 7/2015 |
| JP | 2015520502 A | 7/2015 |
| JP | 2015531978 A | 11/2015 |
| WO | 2011016342 A1 | 2/2011 |
| WO | 2015083314 A1 | 6/2015 |
| WO | 2015141952 A1 | 9/2015 |

OTHER PUBLICATIONS

Bauer I et al., "Reduced polysulfide shuttle in lithium-sulfur batteries using Nafion-based separators", Journal of-Power Sources, vol. 251, 2013, pp. 417-422.; Cited in EESR.

Bauer, I. et al., "Reduced polysulfide shuttle in lithium-sulfur batteries using Nafion-based separators," Journal of Power Sources, Dec. 7, 2013, p. 417-422, vol. 251, Elsevier, The Netherlands; Cited in Specification.

Cai, Zhijun et al., "High performance of lithium-ion polymer battery based on non-aqueous lithiated perfluorinated sulfonic ion-exchange membranes," Energy & Environmental Science, Dec. 13, 2011, p. 5690-5693 plus S1, vol. 5, The Royal Society of Chemistry, United Kingdom.

Chen, Hong-Yan et al., "Dextran based highly conductive hydrogel polysulfide electrolyte for efficient quasi-solid-state quantum dot-sensitized solar cells," Electrochimica Acta, Jan. 11, 2013, p. 117-123, vol. 92, Elsevier, The Netherlands.

Jin, Zhaoqing, et al., "Application of lithiated Nafion ionomer film as functional separator for lithium sulfur cells," Journal of Power Sources, Jul. 7, 2012, p. 163-167, vol. 218, Elsevier, The Netherlands; Cited in Specification.

International Search Report dated Jan. 10, 2017 filed in PCT/JP2016/004424.

NONAQUEOUS ELECTROLYTE SECONDARY BATTERY

TECHNICAL FIELD

The present invention relates to a nonaqueous electrolyte secondary battery.

BACKGROUND ART

Nonaqueous electrolyte secondary batteries typified by lithium ion secondary batteries are widely used in portable terminals, electric vehicles, hybrid vehicles and the like, and it is expected that the energy density will continue to increase in the future. Currently, in lithium ion secondary batteries that have been put to practical use, a lithium transition metal oxide is mainly used as a positive active material, a carbon material is mainly used as a negative active material, and a nonaqueous electrolyte with a lithium salt dissolved in a nonaqueous solvent is mainly used as an electrolyte.

Studies on use of sulfur as a replacement for a lithium transition metal oxide as a positive active material for a nonaqueous electrolyte secondary battery are being conducted. Sulfur has a large theoretical capacity of 1675 mAh/g per mass, and is therefore expected as a next generation positive active material for increasing the capacity.

However, there is the problem that a shuttle phenomenon occurs in which lithium polysulfide ($Li_2S_n$, $4 \leq n \leq 8$) generated in a positive electrode during charge-discharge is dissolved in a nonaqueous electrolyte, reaches a negative electrode, and is reduced, resulting in self discharge. A technique is known in which a cation exchange resin layer is disposed between a positive electrode and a negative electrode for suppressing shuttle phenomenon (Patent Documents 1 to 3 and Non-Patent Documents 1 and 2).

PRIOR ART DOCUMENTS

Patent Documents

Patent Document 1: JP-A-2015-128063
Patent Document 2: WO 2015/083314
Patent Document 3: JP-W-2015-507837

Non-Patent Documents

Non-Patent Document 1: Journal of Power Sources, Vol. 251, p. 417-422 (2014)
Non-Patent Document 2: Journal of Power Sources, Vol. 218, p. 163-167 (2012)

SUMMARY OF THE INVENTION

Problems to be Solved by the Invention

The present inventors have found that by providing a cation exchange resin layer between a positive electrode and a negative electrode, movement of lithium polysulfide from the positive electrode to the negative electrode can be suppressed, but the energy density and charge-discharge cycle performance are not sufficiently high. An object of the present invention is to solve the above-mentioned problem.

A nonaqueous electrolyte secondary battery according to one aspect of the present invention includes a sulfur-containing positive electrode, a negative electrode, a cation exchange resin layer interposed between the positive electrode and the negative electrode, a positive electrode electrolyte, and a negative electrode electrolyte. The positive electrode electrolyte contains lithium polysulfide, and a sulfur equivalent concentration of the positive electrode electrolyte is higher than the sulfur equivalent concentration of the negative electrode electrolyte.

A nonaqueous electrolyte secondary battery according to another aspect of the present invention includes a sulfur-containing positive electrode, a negative electrode, a cation exchange resin layer interposed between the positive electrode and the negative electrode, and a nonaqueous electrolyte. At least one of the positive electrode and the negative electrode includes a cation exchange resin, and a concentration of an anion contained in the nonaqueous electrolyte is 0.7 mol/l or less.

A method for producing a nonaqueous electrolyte secondary battery according to another aspect of the present invention is a method for producing a nonaqueous electrolyte secondary battery including a sulfur-containing positive electrode, a negative electrode, and a cation exchange resin layer interposed between the positive electrode and the negative electrode, the method including injecting a lithium polysulfide-containing positive electrode electrolyte between the positive electrode and the cation exchange resin layer, and injecting a negative electrode electrolyte between the negative electrode and the cation exchange resin layer, the negative electrode electrolyte having a lithium polysulfide concentration lower than that of the positive electrode electrolyte.

Advantages of the Invention

According to one aspect of the present invention, it is possible to provide a nonaqueous electrolyte secondary battery having excellent energy density and charge-discharge cycle performance.

MODE FOR CARRYING OUT THE INVENTION

Figure 1:
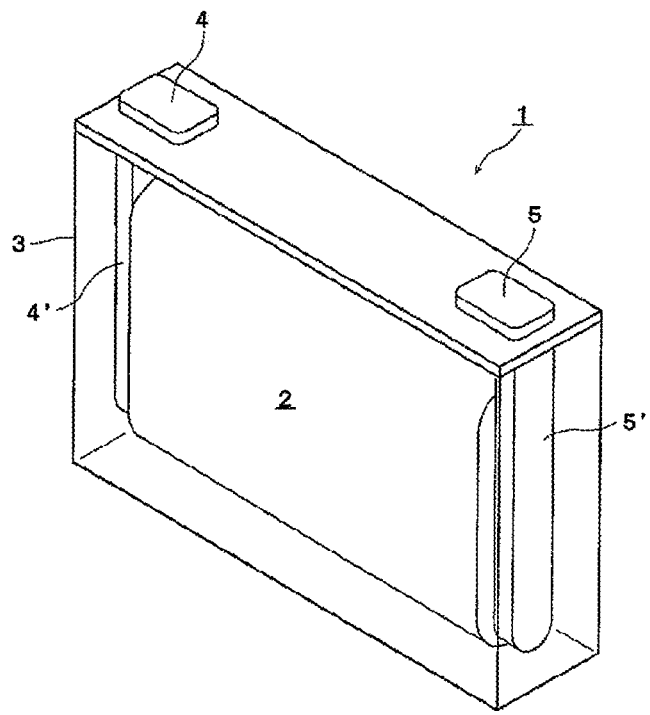
FIG. 1 is a perspective view of an appearance of a nonaqueous electrolyte secondary battery according to a first embodiment.

A nonaqueous electrolyte secondary battery according to one aspect of the present invention includes a sulfur-containing positive electrode, a negative electrode, a cation exchange resin layer interposed between the positive electrode and the negative electrode, a positive electrode electrolyte, and a negative electrode electrolyte. The positive electrode electrolyte contains lithium polysulfide, and the sulfur equivalent concentration of the negative electrode electrolyte is lower than the sulfur equivalent concentration of the positive electrode electrolyte.

With the above-mentioned configuration, a nonaqueous electrolyte secondary battery excellent in energy density and charge-discharge cycle performance can be obtained.

The sulfur equivalent concentration of the positive electrode electrolyte is preferably 1.2 mol/l or more.

With such a configuration, not only charge-discharge cycle performance is further improved, but also charge-discharge efficiency after cycle can be enhanced.

In the above-mentioned configuration, the sulfur equivalent concentration of the positive electrode electrolyte is preferably 3.0 mol/l or more.

With such a configuration, a nonaqueous electrolyte secondary battery having a high capacity and high energy density can be provided.

The sulfur equivalent concentration of the positive electrode electrolyte is preferably 18 mol/l or less.

With such a configuration, a nonaqueous electrolyte secondary battery having high energy density can be obtained because the viscosity of the positive electrode electrolyte does not excessively increase, and interface resistance between the positive electrode electrolyte and the cation exchange resin layer does not excessively increase.

In the above-mentioned configuration, the concentration of an anion contained in at least one of the positive electrode electrolyte and the negative electrode electrolyte is preferably 0.7 mol/l or less.

With such a configuration, it is possible to obtain a nonaqueous electrolyte secondary battery having low interface resistance between a positive electrode electrolyte or a negative electrode electrolyte and a cation exchange resin layer.

The concentration of an anion contained in the positive electrode electrolyte is preferably 0.3 mol/l or less.

With the above-mentioned configuration, interface resistance between the positive electrode electrolyte and the cation exchange resin layer hardly increases even when the concentration of lithium polysulfide contained in the positive electrode electrolyte is increased, and thus a nonaqueous electrolyte secondary battery having a high capacity can be obtained.

A nonaqueous electrolyte secondary battery according to another aspect of the present invention includes a sulfur-containing positive electrode, a negative electrode, a cation exchange resin layer interposed between the positive electrode and the negative electrode, and a nonaqueous electrolyte. At least one of the positive electrode and the negative electrode includes a cation exchange resin, and the concentration of an anion contained in the nonaqueous electrolyte is 0.7 mol/l or less. [0025]1 With such a configuration, a nonaqueous electrolyte secondary battery having excellent energy density and charge-discharge cycle performance can be obtained.

Preferably, the cation exchange resin layer has a first surface having a roughness factor of 3 or more.

With the above-mentioned configuration, the interface resistance of the first surface of the cation exchange resin layer is reduced, so that the high rate discharge performance of the nonaqueous electrolyte secondary battery is improved.

The arithmetic mean roughness Ra of the first surface of the cation exchange resin layer is preferably 0.5 µm or more.

When the arithmetic mean roughness Ra of the first surface of the cation exchange resin layer is 0.5 µm or more, interface resistance can be reduced.

The maximum height roughness Rz of the first surface of the cation exchange resin layer is preferably 5 µm or more.

When the maximum height roughness Rz of the first surface of the cation exchange resin layer is 5 µm or more, the interface resistance of the first surface of the cation exchange resin layer can be reduced even when the electrolyte salt concentration is low.

The nonaqueous electrolyte secondary battery may further include a porous layer. Here, the porous layer is preferably in contact with the first surface of the cation exchange resin layer.

In the cation exchange resin layer, a cation moves selectively (preferentially), and an anion hardly moves as will be described in detail later. On the other hand, in a porous layer impregnated with a nonaqueous electrolyte containing a cation and an anion, both the cation and the anion can move. Thus, in a nonaqueous electrolyte secondary battery including a cation exchange resin layer and a porous layer, there is a difference in ion migration mechanism, and therefore the value of resistance of the interface between the cation exchange resin layer and the porous layer tends to be large. Thus, by applying this embodiment to a nonaqueous electrolyte secondary battery having high interface resistance, interface resistance is remarkably reduced, so that a nonaqueous electrolyte secondary battery having excellent high rate discharge performance can be obtained.

A method for producing a nonaqueous electrolyte secondary battery according to another aspect of the present invention includes a method for producing a nonaqueous electrolyte secondary battery including a sulfur-containing positive electrode, a negative electrode, and a cation exchange resin layer interposed between the positive electrode and the negative electrode. The method includes injecting a lithium polysulfide-containing positive electrode electrolyte between the positive electrode and the cation exchange resin layer, and injecting a negative electrode electrolyte between the negative electrode and the cation exchange resin layer. The negative electrode electrolyte has a lithium polysulfide concentration lower than that of the positive electrode electrolyte.

By using the above-mentioned production method, the concentration of lithium polysulfide contained in the positive electrode electrolyte can be controlled, and therefore a nonaqueous electrolyte secondary battery excellent in charge-discharge cycle performance can be produced.

First Embodiment

Hereinafter, a nonaqueous electrolyte secondary battery according to a first embodiment will be described. All of the embodiments described below show one preferred specific example of the present invention. Numerical values, shapes, materials, constituent elements, arrangement positions and connection forms of the constituent elements, and the like as shown in the following embodiments are illustrative, and are not intended to limit the present invention. Among the constituent elements in the following embodiments, constituent elements that are not described in independent claims showing the top level concept of the present invention will be described as optional constituent elements that constitute a more preferred form.

The nonaqueous electrolyte secondary battery according to the first embodiment includes a sulfur-containing positive electrode, a negative electrode, a cation exchange resin layer interposed between the positive electrode and the negative electrode, a positive electrode electrolyte, and a negative electrode electrolyte. The positive electrode electrolyte contains lithium polysulfide, and the sulfur equivalent concentration of the positive electrode electrolyte is higher than the sulfur equivalent concentration of the negative electrode electrolyte. The positive electrode electrolyte is disposed between the positive electrode and the cation exchange resin layer, and the negative electrode electrolyte is disposed between the cation exchange resin layer and the negative electrode. Hereinafter, the "positive electrode electrolyte" and "negative electrode electrolyte" may be collectively referred to as a "nonaqueous electrolyte". Incidentally, the nonaqueous electrolyte to be used in the nonaqueous electrolyte secondary battery normally contains an electrolyte salt and a nonaqueous solvent, but in this specification, a nonaqueous solvent which does not contain an electrolyte salt may be referred to as a "nonaqueous electrolyte".

The cation exchange resin layer is a layer containing a cation exchange resin, and functions as a separator that keeps the positive electrode and the negative electrode insulated from each other. The cation exchange resin has a structure in which anionic functional groups such as sulfonic acid groups and carboxylic acid groups are bonded in a polymer mainly composed of a hydrocarbon. Due to the electrostatic interaction of the anionic groups, the cation exchange resin has high cation permeability, but has low permeability to an anion. That is, the cation exchange resin allows lithium ions to pass therethrough, and hinders passage of lithium polysulfide made anionic by slight dissolution in the positive electrode electrolyte (electrolyte solution). Accordingly, the cation exchange resin layer suppresses movement of lithium polysulfide from the positive electrode to the negative electrode, and therefore a shuttle phenomenon is suppressed.

Although movement of lithium polysulfide from the positive electrode to the negative electrode is suppressed by the cation exchange resin layer, lithium polysulfide generated in the positive electrode during a charge-discharge reaction has high solubility in a nonaqueous solvent, and is therefore easily dissolved in the positive electrode electrolyte during a charge-discharge cycle. The present inventors have found that by mixing lithium polysulfide with a positive electrode electrolyte disposed between a positive electrode and a cation exchange resin layer, in advance, not only dissolution of lithium polysulfide generated in the positive electrode is suppressed, but also lithium polysulfide in the positive electrode electrolyte contributes to a charge-discharge reaction as a positive active material, so that excellent energy density and charge-discharge cycle performance can be exhibited. That is, the nonaqueous electrolyte secondary battery according to this embodiment has a cation exchange resin layer between a positive electrode and a negative electrode, the positive electrode electrolyte containing lithium polysulfide, the positive electrode electrolyte having a sulfur equivalent concentration higher than the sulfur equivalent concentration of the negative electrode electrolyte. Thus, the nonaqueous electrolyte secondary battery has high charge-discharge cycle performance. Here, the sulfur equivalent concentration is a value obtained by calculating the concentration of a sulfur compound in the nonaqueous electrolyte in terms of a concentration of sulfur atoms. That is, 1 mol/l lithium sulfide ($Li_2S$) corresponds to a sulfur equivalent concentration of 1 mol/l, 1 mol/l $Li_2S_6$ corresponds to a sulfur equivalent concentration of 6 mol/l, and 1 mol/l of sulfur (S) corresponds to a sulfur equivalent concentration of 8 mol/l.

The lower limit of the sulfur equivalent concentration of the positive electrode electrolyte is preferably 1.2 mol/l, more preferably 1.5 mol/l, still more preferably 3.0 mol/l. When the sulfur equivalent concentration is 1.2 mol/l or more, charge-discharge efficiency after charge-discharge cycle is improved. When the sulfur equivalent concentration is 3.0 mol/l or more, a nonaqueous electrolyte secondary battery having a high capacity and high energy density can be provided.

The upper limit of the sulfur equivalent concentration of the positive electrode electrolyte is preferably 18 mol/l, more preferably 12 mol/l, still more preferably 9 mol/l. When the sulfur equivalent concentration is not more than the above-mentioned upper limit, a nonaqueous electrolyte secondary battery having high energy density can be obtained because the viscosity of the positive electrode electrolyte does not excessively increase, and interface resistance between the positive electrode electrolyte and the cation exchange resin layer does not excessively increase.

The nonaqueous electrolytes (positive electrode electrolyte and negative electrode electrolyte) may contain an anion derived from an electrolyte salt. The anion in this embodiment refers to an anion derived from an electrolyte salt dissolved in an nonaqueous electrolyte, and does not include an anionic functional group such as a sulfonic acid group contained in a molecular structure of a cation exchange resin, lithium polysulfide, and a compound made anionic by dissociation of a part of lithium polysulfide.

The upper limit of the concentration of the anion contained in at least one of the positive electrode electrolyte and the negative electrode electrolyte is preferably 0.7 mol/l, more preferably 0.5 mol/l, still more preferably 0.3 mol/l. The upper limit of the concentration of the anion contained in the positive electrode electrolyte is preferably 0.3 mol/l, more preferably 0.2 mol/l, and may be 0 mol/l. When the concentration of the anion is not more than the above-mentioned upper limit, the viscosity of the nonaqueous electrolyte can be reduced, so that a nonaqueous electrolyte secondary battery having a high discharge capacity and excellent charge-discharge cycle performance can be obtained.

The lower limit of the concentration of the anion contained in at least one of the positive electrode electrolyte and the negative electrode electrolyte may be 0 mol/l, but is preferably 0.1 mol/l, more preferably 0.3 mol/l. When the nonaqueous electrolyte contains a small amount of an anion, excellent charge-discharge cycle performance can be obtained.

The lithium polysulfide contained in the positive electrode electrolyte is not particularly limited, but is preferably lithium polysulfide represented by $Li_2S_n$ ($4 \leq n \leq 8$).

A method for preparing lithium polysulfide represented by the composition formula: $Li_2S_n$ ($4 \leq n \leq 8$) is not limited. For example, the above-mentioned lithium polysulfide can be obtained in the following manner: a lithium sulfide ($Li_2S$) and sulfur (S) are mixed and stirred at a target composition ratio in a solvent, and the mixture is then added in a closed container, and reacted in a thermostatic bath at 80° C. for 4 days or more.

In this embodiment, the negative electrode electrolyte has a sulfur equivalent concentration lower than that of the positive electrode electrolyte. That is, the sum of the concentrations of elemental sulfur, lithium polysulfide and $Li_2S$ which are contained in the negative electrode electrolyte is lower than that of the positive electrode electrolyte. Lithium polysulfide reacts with a negative active material, so that the charge depth of the negative active material is reduced, and $Li_2S$ is generated as a reduction product. $Li_2S$ is insoluble in a nonaqueous solvent, and is therefore deposited on a surface of the negative electrode to decrease the reaction area of the negative electrode. Thus, the upper limit of the sulfur equivalent concentration of the negative electrode electrolyte is preferably 0.5 mol/l, and may be 0 mol/l. Since it is known that lithium polysulfide reacts on a negative electrode surface to form a solid electrolyte film (SEI), it is preferable that the negative electrode electrolyte contains a small amount of lithium polysulfide.

The positive electrode according to this embodiment includes a positive electrode substrate, and a positive composite layer disposed on the positive electrode substrate directly or with an intermediate layer interposed therebetween.

For the positive electrode substrate, a known material can be appropriately used as long as it is an electron conductor that does not have an adverse effect in a battery. For the positive electrode substrate, for example, aluminum, titanium, stainless steel, nickel, baked carbon, conductive polymers, conductive glass and the like, as well as aluminum, copper and the like, the surface of which is treated with carbon, nickel, titanium, silver or the like for the purpose of improving adhesion, conductivity and oxidation resistance, can be used. With regard to the shape of the positive electrode substrate, a foil-shaped material, a film-shaped material, a sheet-shaped material, a net-shaped material, a punched or expanded material, a lath material, a porous material, a foamed material, a molded material of fibers, and so on are used. While the thickness is not particularly limited, a material having a thickness of 1 to 500 µm is used.

The intermediate layer is a layer covering a surface of the positive electrode substrate, and contains a conductive agent such as carbon particles, so that contact resistance between the positive electrode substrate and the positive composite layer is reduced. The configuration of the intermediate layer is not particularly limited, and can be formed from, for example, a composition containing a binding agent and a conductive agent.

The positive composite layer contains an active material, a conductive agent and a binding agent, and the active material contains sulfur. Preferably, sulfur combined with a conductive substance is used as the active material. Examples of the conductive substance include carbon materials such as porous carbon, carbon black, graphite and carbon fibers, and electron-conductive polymers such as polyaniline, polythiophene, polyacetylene and polypyrrole.

The positive composite layer may contain an active material other than sulfur, a thickener, a filler and the like as necessary.

The positive composite layer is not required to contain sulfur in a solid state. Here, the positive composite layer contains only a conductive agent and a binding agent, and lithium polysulfide in the positive electrode electrolyte contributes to charge-discharge as an active material. It is preferable that the positive composite layer contains solid sulfur because the discharge capacity and energy density of the nonaqueous electrolyte secondary battery can be improved.

As a positive active material other than sulfur, a known material can be appropriately used as long as it is a positive active material capable of absorbing and releasing lithium ions. For example, the positive active material can be selected from a composite oxide represented by $Li_xMO_y$ (M represents at least one transition metal) ($Li_xCoO_2$, $Li_xNiO_2$, $LiMn_2O_4$, $Li_xMnO_3$, $Li_xNi_yCo_{(1-y)}O_2$, $Li_xNi_yMn_zCo_{(1-y-z)}O_2$, $Li_xNi_yMn_{(2-y)}O_4$ or the like), and a polyanion compound represented by $Li_wMe_x(XO_y)_z$ (Me represents at least one transition metal, and X is, for example, P, Si, B or V) ($LiFePO_4$, $LiMnPO_4$, $LiNiPO_4$, $LiCoPO_4$, $Li_3V_2(PO_4)_3$, $Li_2MnSiO_4$, $Li_2CoPO_4F$ or the like). Incidentally, elements or polyanions in these compounds may be partially substituted with other elements or anionic species, and the surface may be covered with a metal oxide such as $ZrO_2$, MgO or $Al_2O_3$, or carbon. Further, examples of the positive active material include, but are not limited to, conductive polymer compounds such as disulfide, polypyrrole, polyaniline, polypara-styrene, polyacetylene and polyacene-based materials, pseudo graphite structure carbonaceous materials and elemental sulfur. These compounds may be used singly, or in combination of two or more thereof.

The conductive agent is not limited as long as it is an electron conductive material which does not adversely affect battery performance, and for example, conductive materials such as natural graphite (scaly graphite, scalelike graphite, earthy graphite and the like), artificial graphite, carbon black, acetylene black, ketjen black, carbon whiskers, carbon fibers, powders of metals (copper, nickel, aluminum, silver, gold and the like), metal fibers, and conductive ceramic materials can be included alone or as a mixture of two or more thereof. Among them, acetylene black is preferable as the conductive agent from the viewpoint of electron conductivity and coatability. The addition amount of the conductive agent is preferably 0.1% by mass to 50% by mass, more preferably 0.5% by mass to 30% by mass based on the total mass of the positive composite layer. It is preferable that acetylene black is ground into ultrafine particles of 0.1 to 0.5 µm in size because the necessary amount of carbon can be reduced.

As the binding agent, a binding agent that is commonly used in a nonaqueous electrolyte secondary battery, for example one of thermoplastic resins such as polytetrafluoroethylene (PTFE), polyvinylidene fluoride (PVDF), polyethylene and polypropylene; and polymers having rubber elasticity, such as ethylene-propylene-diene terpolymer (EPDM), sulfonated EPDM, styrene butadiene rubber (SBR) and fluorine rubber, or a mixture of two or more thereof can be used. The addition amount of the binding agent is preferably 1 to 50% by mass, more preferably 2 to 30% by mass based on the total mass of the positive composite layer.

Examples of the thickener include polysaccharide polymers such as carboxymethylcellulose (CMC) and methylcellulose. When the thickener has a functional group reactive with lithium, it is preferable to deactivate the functional group by methylation or the like in advance.

The filler is not particularly limited as long as it does not adversely affect battery performance. Examples of the main component of the filler include polyolefins such as polypropylene and polyethylene, silica, alumina, zeolite and glass.

The negative electrode according to this embodiment includes a negative electrode substrate, and a negative composite layer disposed on the negative electrode substrate directly or with an intermediate layer interposed therebetween. The negative composite layer contains a negative active material and a binding agent. The negative composite layer may contain a conductive agent, a thickener, a filler and the like as necessary. The intermediate layer of the negative electrode may be the same as the intermediate layer of the positive electrode.

The negative active material to be used for the negative composite layer is not particularly limited as long as it is a material capable of electrochemically absorbing and releasing lithium ions, and a known material can be appropriately used. Examples of the negative active material include carbonaceous materials, metal oxides such as tin oxide and silicon oxide, metal composite oxides, elemental lithium and lithium alloys such as aluminum alloy, and metals capable of forming an alloy with lithium, such as Sn and Si. Examples of the carbonaceous material include graphite, cokes, non-graphitizable carbon, graphitizable carbon, fullerene, carbon nanotubes, carbon black and active carbon. Among them, graphite is preferable as a negative active material because it has an operating potential extremely close to that of metallic lithium, so that charge-discharge can be performed at a high operating voltage. For example, artificial graphite and natural graphite are preferable. In particular, graphite in which the surfaces of negative active material particles are modified with amorphous carbon or the like is preferable because gas generation during charge is small. These negative active materials may be used singly, or used in any combination and ratio of two or more thereof. Among them, a carbonaceous material or a lithium composite oxide is preferably used from the viewpoint of safety.

As the binding agent to be used for the negative composite layer, various binding agents as described above can be used. Incidentally, the negative composite layer may contain the above-described conductive agent, thickener, filler and the like.

For the negative electrode substrate, for example, copper, nickel, iron, stainless steel, titanium, aluminum, baked carbon, conductive polymers, conductive glass, Al—Cd alloys and the like, as well as copper and the like, the surface of which is treated with carbon, nickel, titanium, silver or the like for the purpose of improving adhesion, conductivity and reduction resistance, can be used.

With regard to the shape of the negative electrode substrate, a foil-shaped material, a film-shaped material, a sheet-shaped material, a net-shaped material, a punched or expanded material, a lath material, a porous material, a foamed material, a molded material of fibers, and so on are used. While the thickness is not particularly limited, a material having a thickness of 1 to 500 μm is used.

In this embodiment, the cation exchange resin layer functions as a separator that insulates the positive electrode and the negative electrode from each other. The cation exchange resin layer contains a cation exchange resin. Examples of the cation exchange resin include polyacrylic acid, polymethacrylic acid, polyvinylbenzenesulfonic acid, polybenzenemethanesulfonic acid and polyacrylamide-2-methyl-1-propanesulfonic acid. Incidentally, a cation exchange resin can be obtained by introducing a sulfonic acid group (—$SO_3H$), a carboxylic acid group (—COOH), or a hydroxyl group (—OH) into any of various resins. Examples of the various resins include perfluorocarbon resins, aromatic polyether ketone resins, polyphenylene sulfide resins, polyether sulfone resins, polyphenylene oxide resins and polybenzimidazole resins.

A perfluorocarbon sulfonic acid type resin with a sulfonic acid group introduced into a perfluorocarbon resin is preferable because high ion conductivity can be attained.

The form in which the cation exchange resin layer contains a cation exchange resin is not particularly limited. A cation exchange film obtained by forming a cation exchange resin into a film shape, or a commercially available ion exchange film may be used. Specific examples of the commercially available ion exchange film include Nafion film (trade name, manufactured by Du Pont), Flemion (trade name, manufactured by ASAHI GLASS CO., LTD.) and Aciplex (trade name, manufactured by Asahi Kasei Corporation).

When a cation exchange film obtained by forming a cation exchange resin into a film shape is used, the thickness of the cation exchange film is preferably from 20 to 180 μm. When the thickness is 20 μm or more, handling during production of a battery is facilitated. When the thickness is 180 μm or less, the risk of increasing the internal resistance of a battery can be reduced, and the energy density of a battery can be improved.

The cation exchange resin layer may be one obtained by molding a mixture of a cation exchange resin and other polymer into a thin-film shape. As the other polymer, a material that forms a porous film as described later can be appropriately used.

The cation exchange resin layer may have a configuration in which the inside of a porous structure of a porous film is filled with a cation exchange resin. The method for filling the inside of the porous structure with the cation exchange resin is not particularly limited, and examples thereof may include a spray method, a dispensing method, a dipping method and a blade coating method.

The cation exchange resin layer does not have pores that communicate from one surface to the other surface. In other words, the cation exchange resin layer is nonporous. When the cation exchange resin layer is nonporous, the positive electrode electrolyte and the negative electrode electrolyte are not mixed, and thus the possibility that lithium polysulfide reaches the negative electrode is reduced. At least one of the surfaces may have pores or irregularities which do not communicate with the other surface. Details of this form will be described in a third embodiment.

Normally, commercially available cation exchange resins or cation exchange films are those of proton ($H^+$) type in which protons are bonded to anionic functional groups. In application of a cation exchange resin or a cation exchange film to a nonaqueous electrolyte secondary battery, it is preferable to convert the resin or film from a $H^+$ type to a lithium ($Li^+$) type. Conversion to the $Li^+$ type is performed by immersing the separator in a lithium hydroxide aqueous solution. After immersion, the separator is washed with deionized water at 25° C. until washing water is neutral. The temperature of the lithium hydroxide aqueous solution is preferably 70° C. to 90° C., and the immersion time is preferably 2 hours to 6 hours.

Preferably, the cation exchange resin layer contains a nonaqueous solvent for conduction of lithium ions in the layer. As the nonaqueous solvent contained in the cation exchange resin layer, various nonaqueous solvents usable for the later-described positive electrode electrolyte or negative electrode electrolyte can be appropriately used. A cation exchange resin layer which does not contain a nonaqueous solvent may be directly applied to a nonaqueous electrolyte secondary battery, but in some of cation exchange resins, a nonaqueous solvent (or nonaqueous electrolyte) has low swelling property, and therefore it is preferable to perform a swelling treatment with a nonaqueous solvent before preparation of a battery. The swelling treatment is performed by immersing in a nonaqueous solvent a cation exchange resin layer converted to the $Li^+$ type. The swelling treatment time is preferably 12 to 48 hours.

The amount of the nonaqueous solvent contained in the cation exchange resin layer may be 30% by mass or less based on the cation exchange resin layer. With such a configuration, the cation exchange resin layer is moderately swollen with the nonaqueous solvent, and movement of lithium ions in the cation exchange resin layer is facilitated. As a result, the discharge capacity of the nonaqueous electrolyte secondary battery can be increased.

In a method for adjusting the mass of a nonaqueous solvent contained in the cation exchange resin layer, a nonaqueous solvent having low impregnation property into a cation exchange resin may be used, or the amount of a nonaqueous solvent in which a cation exchange resin is immersed may be set to 30 mass % or less based on the amount of the cation exchange resin in advance. Examples of the solvent having low impregnation property into the cation exchange resin layer include ethers such as 1,3-dioxane, 1,4-dioxane, 1,2-dimethoxyethane, 1,4-dibutoxyethane, methyl diglyme, dimethyl ether and diethyl ether; chain carbonates such as dimethyl carbonate, diethyl carbonate and ethyl methyl carbonate; and cyclic carbonates such as ethylene carbonate, propylene carbonate and butylene carbonate. Incidentally, a nonaqueous solvent to be used for the later-described positive electrode electrolyte or negative electrode electrolyte can be appropriately used as a swelling solvent.

In addition to the cation exchange resin layer, a porous film to be used in a conventional nonaqueous electrolyte secondary battery may be used as a separator. As the porous film, a synthetic resin microporous film, woven fabric or nonwoven fabric, a woven fabric or nonwoven fabric of natural fibers, glass fibers or ceramic fibers, paper, or the like can be used. Examples of the synthetic resin that can be used include polyolefin-based resins, typically polyethylene, polypropylene and the like; polyester-based resins, typically polyethylene terephthalate, polybutylene terephthalate and the like; polyvinylidene fluoride; vinylidene fluoride-hexafluoropropylene copolymers; vinylidene fluoride-perfluorovinyl ether copolymers; vinylidene fluoride-tetrafluoroethylene copolymers; vinylidene fluoride-trifluoroethylene copolymers; vinylidene fluoride-fluoroethylene copolymers; vinylidene fluoride-hexafluoroacetone copolymers; vinylidene fluoride-ethylene copolymers; vinylidene fluoride-propylene copolymers; vinylidene fluoride-trifluoropropylene copolymers; vinylidene fluoride-tetrafluoroethylene-hexafluoropropylene copolymers; vinylidene fluoride-ethylene-tetrafluoroethylene copolymers; polyacrylonitrile; polyamide; polyimide; and polyamideimide. Among them, a synthetic resin microporous film composed of an organic solvent-insoluble woven fabric or nonwoven fabric, or a polyolefin resin such as polyethylene or polypropylene is preferably used. The porous film may be formed by laminating a plurality of microporous films having different materials, weight average molecular weights or porosities, and these microporous films may contain a moderate amount of various kinds of additives such as plasticizers, antioxidants and flame retardants. From the viewpoints of thickness, film strength, film resistance and the like, it is especially preferable to use a polyolefin-based microporous film such as a microporous film made of polyethylene or polypropylene, a microporous film made of polyethylene or polypropylene combined with aramid or polyimide, a microporous film obtained by combining these films, or the like. The thickness of the porous film is preferably 5 to 35 µm.

The nonaqueous solvent to be used for the positive electrode electrolyte and the negative electrode electrolyte is not limited, and one that is generally proposed to be used in a lithium secondary battery or the like can be used. Examples of the nonaqueous solvent include, but are not limited to, cyclic carbonic acid esters such as propylene carbonate, ethylene carbonate, butylene carbonate, chloroethylene carbonate and vinylene carbonate; cyclic esters such as γ-butyrolactone and γ-valerolactone; chain carbonates such as dimethyl carbonate, diethyl carbonate and ethyl methyl carbonate; chain esters such as methyl formate, methyl acetate and methyl butyrate; tetrahydrofuran or a derivatives thereof, ethers such as 1,3-dioxane, 1,4-dioxane, 1,2-dimethoxyethane, 1,4-dibutoxyethane and methyl diglyme; nitriles such as acetonitrile and benzonitrile; dioxolane or derivatives thereof ethylene sulfide, sulfolane, sultone or derivatives thereof. These compounds are used singly, or in mixture of two or more thereof.

In this embodiment, the positive electrode electrolyte or the negative electrode electrolyte may contain additives. As the additive, an electrolyte additive that is generally used in a nonaqueous electrolyte secondary battery can be used. Examples of the electrolyte additive include aromatic compounds such as biphenyl, alkylbiphenyls, terphenyl, partially hydrogenated products of terphenyl, cyclohexylbenzene, t-butylbenzene, t-amylbenzene, diphenyl ether and dibenzofuran; partially fluorinated products of the aromatic compounds such as 2-fluorobiphenyl, o-cyclohexylfluorobenzene and p-cyclohexyl fluorobenzene; fluorine-containing anisole compounds such as 2,4-difluoroanisole, 2,5-difluoroanisole, 2,6-difluoroanisole and 3,5-difluoroanisole; cyclic carbonates such as vinylene carbonate, methylvinylene carbonate, ethylvinylene carbonate, fluoroethylene carbonate, difluoroethylene carbonate and trifluoropropylene carbonate; carboxylic anhydrides such as succinic anhydride, glutaric anhydride, maleic anhydride, citraconic anhydride, glutaconic anhydride, itaconic anhydride and cyclohexanedicarboxylic anhydride; sulfur-containing compounds such as ethylene sulfite, propylene sulfite, dimethyl sulfite, propane sultone, propene sultone, butane sultone, methyl methanesulfonate, busulfan, methyl toluenesulfonate, dimethyl sulfate, ethylene sulfate, sulfolane, dimethyl sulfone, diethyl sulfone, dimethylsulfoxide, diethylsulfoxide, tetramethylene sulfoxide, diphenyl sulfide, thioanisole, diphenyl disulfide and dipyridinium disulfide; perfluorooctane; tristrimethylsilyl borate; tristrimethylsilyl phosphate; and tetrakistrimethylsilyl titanate. These compounds can be used singly, or in combination of two or more thereof.

As the electrolyte salt contained in the positive electrode electrolyte or the negative electrode electrolyte, a known electrolyte salt can be appropriately used. Examples of the electrolyte salt include inorganic ionic salts containing one of lithium (Li), sodium (Na) and potassium (K), such as $LiClO_4$, $LiBF_4$, $LiAsF_6$, $LiPF_6$, $LiSCN$, $LiBr$, $LiI$, $Li_2SO_4$, $Li_2B_{10}Cl_{10}$, $NaClO_4$, $NaI$, $NaSCN$, $NaBr$, $KClO_4$ and $KSCN$; and organic ionic salts such as $LiCF_3SO_3$, LiN $(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearylsulfonate, lithium octylsulfonate and lithium dodecylbenzenesulfonate. These ionic compounds can be used singly, or in combination of two or more thereof.

Further, use of a mixture of $LiPF_6$ or $LiBF_4$ with a lithium salt having a perfluoroalkyl group, such as $LiN(C_2F_5SO_2)_2$ is more preferable because the viscosity of the electrolyte can be further reduced, so that low-temperature performance can be further improved, and self discharge can be suppressed.

The nonaqueous electrolyte may contain a normal-temperature molten salt or an ionic liquid.

A method for producing a nonaqueous electrolyte secondary battery according to this embodiment includes injecting a lithium polysulfide-containing positive electrode electrolyte between the positive electrode and the cation exchange resin layer, and injecting a negative electrode electrolyte between the negative electrode and the cation exchange resin layer, the negative electrode electrolyte having a lithium polysulfide concentration lower than that of the positive electrode electrolyte. The production method may include, for example, the steps of (1) preparing a positive electrode; (2) preparing a negative electrode; (3) preparing a positive electrode electrolyte and a negative electrode electrolyte; (4) immersing a cation exchange resin layer in a nonaqueous electrolyte or a nonaqueous solvent; (5) injecting the positive electrode electrolyte between the positive electrode and the cation exchange resin layer; (6) injecting the negative electrode electrolyte between the negative electrode and the cation exchange resin layer; (7) forming alternately stacked electrode groups by stacking or winding the positive electrode and the negative electrode with the cation exchange resin layer interposed therebetween; (8) placing the positive electrode and the negative electrode (electrode group) in a battery container (case); and (9) sealing an opening section of the battery container.

The positive electrode electrolyte prepared in the step (3) contains at least lithium polysulfide, and the negative electrode electrolyte has a sulfur equivalent concentration lower than that of the positive electrode electrolyte. The sulfur equivalent concentration of the positive electrode electrolyte is preferably 1.2 mol/l or more, more preferably 1.5 mol/l or more, still more preferably 3.0 mol/l or more.

The step (5) may be carried out by dropping the positive electrode electrolyte directly to the positive electrode, or by disposing a porous layer or the like impregnated with the positive electrode electrolyte between the positive electrode and the cation exchange resin layer. The same applies to the step (6).

The above steps (1) to (4) may be carried out in any order, and the steps (5) to (7) may be carried out simultaneously or sequentially.

The nonaqueous electrolyte secondary battery in this embodiment is, for example, a nonaqueous electrolyte secondary battery 1 (lithium ion secondary battery) shown in FIG. 1.

As shown in FIG. 1, the nonaqueous electrolyte secondary battery 1 includes a container 3, a positive electrode terminal 4, and a negative electrode terminal 5. The container 3 includes a container body that stores an electrode group 2 etc., and a lid plate being an upper wall. Incidentally, the electrode group 2, a positive electrode lead 4' and a negative electrode lead 5' are disposed inside the container body.

A positive electrode 11 is electrically connected to the positive electrode terminal 4 through the positive electrode lead 4', and a negative electrode 13 is electrically connected to the negative electrode terminal 5 through the negative electrode lead 5'. The positive electrode 11 is impregnated with a positive electrode electrolyte, and the negative electrode 13 is impregnated with a negative electrode electrolyte. Such liquids are not illustrated.

The electrode group 2 includes the positive electrode 11, the negative electrode 13, and a cation exchange resin layer 15 as a separator, and is capable of storing electricity. Specifically, as shown in FIG. 2, the electrode group 2 is formed in such a manner that the cation exchange resin layer 15 is disposed so as to be sandwiched between the negative electrode 13 and the positive electrode 11 in a layered form.

Figure 2:
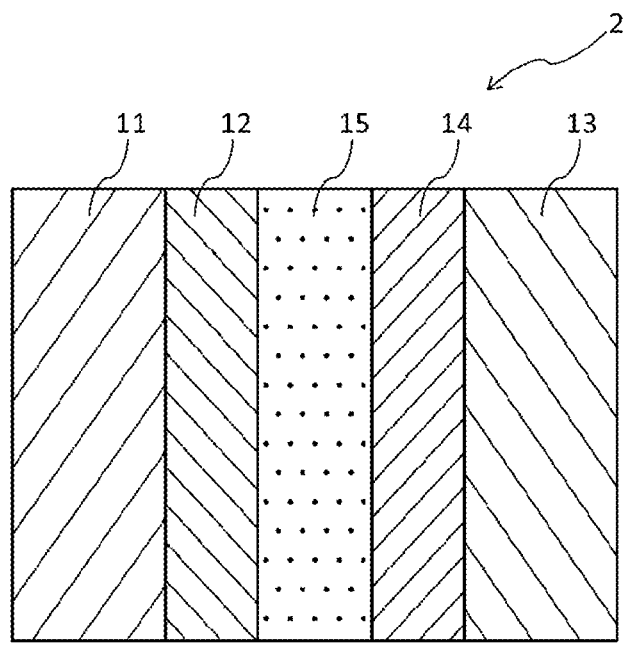
FIG. 2 is a partial schematic sectional view of the nonaqueous electrolyte secondary battery according to the first embodiment.

FIG. 2 is a partial schematic sectional view of the electrode group 2. The electrode group 2 includes a positive electrode electrolyte 12 between the positive electrode 11 and the cation exchange resin layer 15, and a negative electrode electrolyte 14 between the negative electrode 13 and the cation exchange resin layer 15. The positive electrode electrolyte 12 contains lithium polysulfide. The cation exchange resin layer 15 contains a cation exchange resin. The sulfur equivalent concentration of the negative electrode electrolyte 14 is lower than the sulfur equivalent concentration of the positive electrode electrolyte 12.

In FIG. 2, the positive electrode 11 and the positive electrode electrolyte 12 are shown separately, and the negative electrode 13 and the negative electrode electrolyte 14 are shown separately. However, since the positive electrode 11 and the negative electrode 13 are impregnated with the positive electrode electrolyte 12 and the negative electrode electrolyte 14, respectively, the positive electrode 11 is in contact with one surface of the cation exchange resin layer 15, and the negative electrode 13 is in contact with the other surface of the cation exchange resin layer 15 in a practical battery.

In the above description, the positive electrode 11 is in contact with one surface of the cation exchange resin layer 15, and the negative electrode 13 is in contact with the other surface of the cation exchange resin layer 15, but a porous layer (porous film) may be disposed between the positive electrode 11 and the cation exchange resin layer 15 and/or between the negative electrode 13 and the cation exchange resin layer 15. The porous layer disposed between the positive electrode 11 and the cation exchange resin layer 15 is impregnated with the positive electrode electrolyte, and the porous layer disposed between the negative electrode 13 and the cation exchange resin layer 15 is impregnated with the negative electrode electrolyte.

Figure 3:
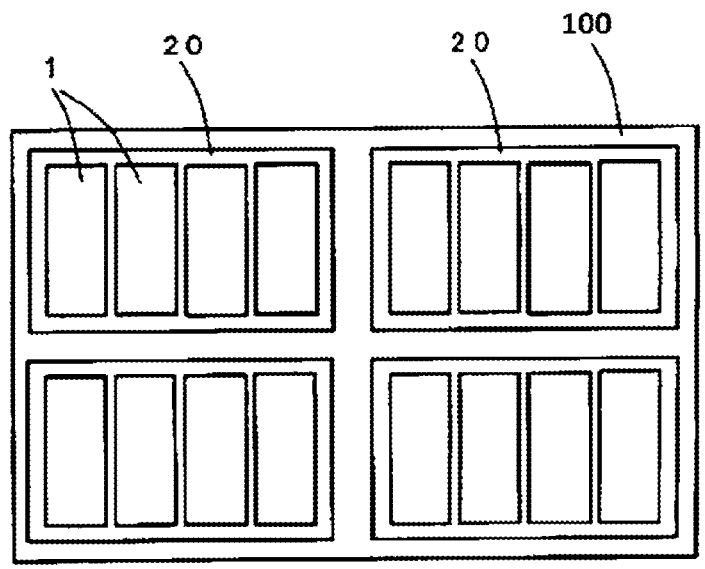
FIG. 3 is a schematic view showing an energy storage apparatus formed by assembling a plurality of nonaqueous electrolyte secondary batteries according to the first embodiment.

The configuration of the nonaqueous electrolyte secondary battery according to the present invention is not particularly limited, and examples of the nonaqueous electrolyte secondary battery include cylindrical batteries, prismatic batteries (rectangular batteries) and flat batteries. The present invention may also encompass an energy storage apparatus including a plurality of nonaqueous electrolyte secondary batteries described above. FIG. 3 shows one embodiment of an energy storage apparatus. In FIG. 3, an energy storage apparatus 100 includes a plurality of energy storage units 20. Each of the energy storage units 20 includes a plurality of nonaqueous electrolyte secondary batteries 1. The energy storage apparatus 100 can be mounted as a power source for an automobile such as an electric vehicle (EV), a hybrid vehicle (HEV), a plug-in hybrid vehicle (PHEV), or the like.

Second Embodiment

Hereinafter, a nonaqueous electrolyte secondary battery according to a second embodiment will be described. All of the embodiments described below show one preferred specific example of the present invention. Numerical values, shapes, materials, constituent elements, arrangement positions and connection forms of the constituent elements, and the like as shown in the following embodiments are illustrative, and are not intended to limit the present invention. Among the constituent elements in the following embodiments, constituent elements that are not described in independent claims showing the top level concept of the present invention will be described as optional constituent elements that constitute a more preferred form. Descriptions of the same constituent elements as in the first embodiment will be omitted.

The nonaqueous electrolyte secondary battery according to the second embodiment includes a sulfur-containing positive electrode, a negative electrode, a cation exchange resin layer interposed between the positive electrode and the negative electrode, and a nonaqueous electrolyte. At least one of the positive electrode and the negative electrode includes a cation exchange resin, and the concentration of an anion contained in the nonaqueous electrolyte is 0.7 mol/l or less. More specifically, the nonaqueous electrolyte secondary battery according to the second embodiment includes a sulfur-containing positive electrode, a negative electrode, a cation exchange resin layer interposed between the positive electrode and the negative electrode, a positive electrode electrolyte (one example of a nonaqueous electrolyte) disposed between the positive electrode and the cation exchange resin layer, and a negative electrode electrolyte (one example of a nonaqueous electrolyte) disposed between the negative electrode and the cation exchange resin layer. At least one of the positive electrode and the negative electrode includes a cation exchange resin, and the concentration of an anion contained in the positive electrode electrolyte and the negative electrode electrolyte is 0.7 mol/l or less.

In the nonaqueous electrolyte secondary battery according to the second embodiment, at least one of the positive electrode and the negative electrode includes a cation exchange resin. The aspect in which at least one of the positive electrode and the negative electrode includes a cation exchange resin is not particularly limited, but it is preferable that the cation exchange resin is provided on a surface of or in a positive composite layer or a negative composite layer. That is, the cation exchange resin may cover a surface of the composite layer, or may be present in at least a part of the inside of the composite layer.

As described above, the cation exchange resin allows only a cation to pass therethrough, and hinders passage of an anion. Therefore, the transport number of lithium ions in the cation exchange resin is approximately 1. That is, the cation exchange resin is a single ion conductor. On the other hand, in a nonaqueous electrolyte containing a lithium salt, both the lithium ion and the counter anion move, so that the transport number of lithium ions is not 1, and thus the nonaqueous electrolyte is not a single ion conductor. Since there is a difference in ion migration mechanism as described above, the interface between the nonaqueous electrolyte and the cation exchange resin layer has high interface resistance.

In this embodiment, at least one of the positive electrode and the negative electrode contains a cation exchange resin, so that a lithium conduction path composed of the cation exchange resin is formed between the cation exchange resin layer and a positive active material or a negative active material. That is, since lithium ions can move back and forth between the cation exchange resin layer and the positive active material or the negative active material without passing through the nonaqueous electrolyte, interface resistance of the cation exchange resin layer can be reduced. Accordingly, it is thought that a nonaqueous electrolyte secondary battery having high energy density and excellent charge-discharge cycle performance can be obtained.

The positive electrode according to the second embodiment includes a positive electrode substrate, and a positive composite layer formed on the positive electrode substrate directly or with an intermediate layer interposed therebetween. The configurations of the positive electrode substrate and the intermediate layer are the same as in the first embodiment. The positive composite layer includes a positive active material, a conductive agent, a binding agent and a cation exchange resin. The positive composite layer may contain a thickener, a filler and the like as necessary. As the positive active material, the conductive agent, the binding agent, the thickener, the filler and the like, the materials described in the first embodiment can be used.

The amount of the cation exchange resin in the positive composite layer is preferably 10% by mass to 150% by mass based on the total mass of the positive composite layer. It is preferable that the amount of the cation exchange resin is 10% by mass to 150% by mass based on the total mass of the positive composite layer because a continuous lithium ion conduction channel can be formed in the positive composite layer.

The negative electrode according to the second embodiment includes a negative electrode substrate and a negative composite layer disposed on the negative electrode substrate directly or via an intermediate layer. The negative electrode substrate and the intermediate layer may have the same configuration as in the first embodiment. The negative composite layer includes a negative active material, a binding agent and a cation exchange resin. The negative composite layer may contain a conductive agent, a thickener, a filler and the like as necessary. The negative active material, the binding agent, the conductive agent, the thickener and the filler may have the same configuration as in the first embodiment.

The amount of the cation exchange resin in the negative composite layer is preferably 10% by mass to 150% by mass based on the total mass of the negative composite layer. It is preferable that the amount of the cation exchange resin is 10% by mass to 150% by mass based on the total mass of the negative composite layer because a continuous lithium ion conduction channel can be formed in the negative composite layer.

A positive electrode with a cation exchange resin present in a positive composite layer can be prepared in the following manner. A particulate positive active material, a cation exchange resin, a conductive agent and a binding agent are mixed with a dispersion medium such as an alcohol or toluene to prepare a positive composite paste. The resulting positive composite paste is applied to both surfaces of a sheet-shaped positive electrode substrate, dried, and then pressed to prepare a positive electrode. As a method for mixing the positive active material, the cation exchange resin, the conductive agent, the binding agent and the like, for example, a method is employed in which these components are mixed in a dry or wet process using a powder mixer such as a V-type mixer, a S-type mixer, a kneader, a ball mill or a planetary ball mill. For the cation exchange resin, the materials mentioned in the first embodiment can be appropriately used.

A negative electrode with a cation exchange resin contained in a negative composite layer can also be prepared by the above-described method.

A solution containing a cation exchange resin may be applied onto the positive composite layer or the negative composite layer to cover a surface of the positive electrode or the negative electrode with the cation exchange resin. Here, it is preferable that the solution containing a cation exchange resin impregnated with the composite layer, so that the cation exchange resin is present on a surface of and in the composite layer. Examples of the method for applying the solution containing a cation exchange resin include a spray method, a dispensing method, a dipping method and a blade coating method.

In this embodiment, the cation exchange resin may be contained in at least one of the positive electrode and the negative electrode, but it is preferable that the cation exchange resin is contained in the positive electrode, or may be contained in both the positive electrode and the negative electrode. When the cation exchange resin is contained in the positive electrode, lithium polysulfide generated at the positive electrode during a charge-discharge reaction is inhibited from being dissolved in the positive electrode electrolyte present in the vicinity of the positive electrode, so that the capacity of the positive electrode is hardly reduced. When the cation exchange resin is contained in the positive electrode and the negative electrode, a lithium ion conduction path of the cation exchange resin is formed to extend from the positive electrode through the cation exchange resin layer to the negative electrode, so that lithium ion conduction can be improved to achieve a high discharge capacity and high charge-discharge efficiency.

A positive electrode or negative electrode containing a cation exchange resin, and a cation exchange resin layer may be provided integrally. That is, the cation exchange resin layer may be bonded to a surface of the positive electrode or negative electrode containing a cation exchange resin. Here, when the cation exchange resin is contained in the inside of the positive composite layer, the effect of the present embodiment can be obtained.

Further, in the second embodiment, the concentration of an anion contained in the nonaqueous electrolyte is 0.7 mol/l or less. The nonaqueous electrolyte contains an electrolyte salt including a cation and an anion, a nonaqueous solvent, and additives as necessary. Here, the nonaqueous electrolyte refers to a positive electrode electrolyte and a negative electrode electrolyte. That is, in this embodiment, the concentration of an anion contained in each of the positive electrode electrolyte and the negative electrode electrolyte is 0.7 mol/l or less.

The anion in this embodiment refers to an anion derived from an electrolyte salt dissolved in the nonaqueous electrolyte, and does not include an anionic functional group such as a sulfonic acid group contained in the molecular structure of the cation exchange resin, lithium polysulfide, and a compound made anionic by dessociation of a part of lithium polysulfide.

The electrolyte salt, the nonaqueous solvent and the additives may have the same configuration as in the first embodiment.

The upper limit of the concentration of the anion contained in the nonaqueous electrolyte is 0.7 mol/l, preferably 0.5 mol/l, more preferably 0.3 mol/l. The upper limit of the concentration of the anion contained in the positive electrode electrolyte is preferably 0.3 mol/l, more preferably 0.2 mol/l, and may be 0 mol/l. When the concentration of the anion is not more than the above-mentioned upper limit, the viscosity of the nonaqueous electrolyte can be reduced, so that a nonaqueous electrolyte secondary battery having a high discharge capacity and excellent charge-discharge cycle performance can be obtained.

The lower limit of the concentration of the anion contained in the nonaqueous electrolyte may be 0 mol/l, but is preferably 0.1 mol/l, more preferably 0.3 mol/l. When the nonaqueous electrolyte contains a small amount of an anion, excellent charge-discharge cycle performance can be obtained.

The positive electrode electrolyte according to the second embodiment may contain lithium polysulfide, and the sulfur equivalent concentration of the negative electrode electrolyte may be lower than that of the positive electrode electrolyte.

At least one of the positive electrode electrolyte and the negative electrode electrolyte may be impregnated into the porous film, and disposed between the positive electrode and the cation exchange resin layer or between the negative electrode and the cation exchange resin layer. For the porous film, the same configuration as that of the porous film described in the first embodiment can be employed.

The type of the cation exchange resin contained in the cation exchange resin layer according to the second embodiment, the form of the cation exchange resin layer, and the like may be the same as in the first embodiment.

The nonaqueous electrolyte secondary battery of the second embodiment can be produced in the same manner as in the case of the nonaqueous electrolyte secondary battery of the first embodiment except that the positive electrode or the negative electrode contains a cation exchange resin. That is, a method for producing the nonaqueous electrolyte secondary battery of the second embodiment includes adding a cation exchange resin in at least one of the positive electrode and the negative electrode in the step of (1) preparing the positive electrode or (2) preparing the negative electrode. Alternatively, the method may include the step of (1') adding a cation exchange resin in at least one of the positive electrode and the negative electrode after the step of (1) preparing the positive electrode or (2) preparing the negative electrode.

The nonaqueous electrolyte secondary battery according to the second embodiment may have the same configuration as that of the nonaqueous electrolyte secondary battery according to the first embodiment. That is, a nonaqueous electrolyte secondary battery 1 includes a container 3, a positive electrode terminal 4, and a negative electrode terminal 5. The container 3 includes a container body that stores an electrode group 2 etc., and a lid plate being an upper wall. Incidentally, the electrode group 2, a positive electrode lead 4' and a negative electrode lead 5' are disposed inside the container body. As shown in FIG. 2, the electrode group 2 includes a positive electrode electrolyte 12 (one example of a nonaqueous electrolyte) between the positive electrode 11 and the cation exchange resin layer 15, and a negative electrode electrolyte 14 (one example of a nonaqueous electrolyte) between the negative electrode 13 and the cation exchange resin layer 15. The cation exchange resin layer 15 contains a cation exchange resin. At least one of the positive electrode 11 and the negative electrode 13 contains a cation exchange resin. The concentration of an anion contained in the positive electrode electrolyte and the negative electrode electrolyte is 0.7 mol/l or less. The positive electrode electrolyte and the negative electrode electrolyte may have the same configuration, or different configurations. The positive electrode electrolyte may contain lithium polysulfide.

A plurality of nonaqueous electrolyte secondary batteries according to the second embodiment may be assembled to form the energy storage apparatus shown in FIG. 3.

Third Embodiment

Hereinafter, a nonaqueous electrolyte secondary battery according to a third embodiment will be described. All of the embodiments described below show one preferred specific example of the present invention. Numerical values, shapes, materials, constituent elements, arrangement positions and connection forms of the constituent elements, and the like as shown in the following embodiments are illustrative, and are not intended to limit the present invention. Among the constituent elements in the following embodiments, constituent elements that are not described in independent claims showing the top level concept of the present invention will be described as optional constituent elements that constitute a more preferred form. Descriptions of the same constituent elements as in the first embodiment or the second embodiment will be omitted.

The nonaqueous electrolyte secondary battery according to the third embodiment includes a sulfur-containing positive electrode, a negative electrode, a cation exchange resin layer interposed between the positive electrode and the negative electrode, and a nonaqueous electrolyte. The cation exchange resin layer has a first surface having a roughness factor of 3 or more. The nonaqueous electrolyte includes a positive electrode electrolyte disposed between the positive electrode and the cation exchange resin layer, and a negative electrode electrolyte disposed between the negative electrode and the cation exchange resin layer. The roughness factor is a ratio of an actual surface area to an apparent unit surface area (geometric unit area).

In the cation exchange resin layer according to this embodiment, the lower limit of the roughness factor of at least a first surface which is one surface is 3, preferably 4, more preferably 10. The upper limit of the roughness factor of the first surface of the cation exchange resin layer is preferably 20, more preferably 18, still more preferably 16. When the roughness factor is 3 or more, resistance at the interface between the cation exchange resin layer and the nonaqueous electrolyte decreases, so that the high rate discharge performance of the nonaqueous electrolyte secondary battery is improved.

The first surface of the cation exchange resin layer in this embodiment has an arithmetic mean roughness Ra of preferably 0.5 μm or more, more preferably 2 μm or more as defined by JIS B 0601:2013. When the arithmetic mean roughness Ra falls within the above-mentioned range, resistance at the interface between the cation exchange resin layer and the positive electrode can be reduced. Further, for maintaining the strength of the cation exchange resin layer, the arithmetic mean roughness Ra is preferably 10 μm or less, more preferably 8 μm or less, still more preferably 5 μm or less.

The first surface of the cation exchange resin layer in this embodiment has a maximum height roughness Rz of preferably 5 μm or more, more preferably 10 μm or more as defined in JIS B 0601:2013. When the maximum height roughness Rz falls within the above-mentioned range, interface resistance can be reduced even at a low electrolyte salt concentration in the nonaqueous electrolyte. The maximum height roughness Rz is preferably 30 μm or less, more preferably 28 μm or less.

The roughness factor, the arithmetic mean roughness Ra and the maximum height roughness Rz of the first surface of the cation exchange resin layer are determined by photographing and measuring a surface of the cation exchange resin layer under the following conditions, and performing shape analysis.

Measuring equipment: Ultra-Deep Shape Measurement Microscope VK-8500 (Manufactured by KEYENCE CORPORATION)

Measurement range: $1.04 \times 10^{-3}$ cm$^2$

Shape analysis application: VK-H1A9 (Manufactured by KEYENCE CORPORATION)

Examples of the method of roughening treatment for setting the roughness factor of the cation exchange resin layer according to the third embodiment to 3 or more include a method in which a surface of the cation exchange resin layer is roughened with a polishing material such as sandpaper; a sandblasting method and a chemical etching method. As the polishing material, it is preferable to use a sand paper in which a polishing agent for polished cloth and paper has a grain size of 320 to 1000 as specified in JIS R 6010:2000.

The thickness of the cation exchange resin layer according to the third embodiment is preferably from 20 to 180 μm, more preferably from 30 to 180 μm. When the thickness is 30 μm or more, the cation exchange resin layer retains a sufficient thickness even when subjected to a roughening treatment, and therefore handling during production of a battery is facilitated. When the thickness is 180 μm or less, the internal resistance of a battery can be reduced, and the energy density of a battery can be improved.

The cation exchange resin layer may be one obtained by molding a mixture of a cation exchange resin and other polymer into a thin-film shape, and roughening the molded product. As the other polymer, the material that forms the porous film described in the first embodiment can be appropriately used.

The nonaqueous electrolyte secondary battery according to the third embodiment may further include a porous layer. The porous layer is preferably in contact with the first surface of the cation exchange resin layer. As the porous layer, the porous film described in the first embodiment is preferably used.

Normally, surfaces of the positive electrode and the negative electrode have irregularities derived from the particulate active material. Thus, when a cation exchange resin layer having low flexibility is used, the contact area between the roughened first surface and the positive electrode or the negative electrode may decrease as compared to a case where the first surface is not roughened. The porous layer containing a polymer is superior in flexibility to the cation exchange resin layer, and therefore when the porous layer is in contact with the first surface of the cation exchange resin layer, contact between the positive electrode and the porous layer and between the porous layer and the cation exchange resin layer, or contact between the negative electrode and the porous layer and between the porous layer and the cation exchange resin layer is well maintained, so that lithium ions are well transmitted. Further, since the nonaqueous electrolyte can be held in the porous layer, uneven distribution of the nonaqueous electrolyte in the positive electrode or the negative electrode hardly occurs, so that the charge-discharge reaction at the positive electrode or the negative electrode can be made uniform.

The porous layer may be provided only between the positive electrode and the first surface of the cation exchange resin layer, or provided only between the negative electrode and the first surface of the cation exchange resin layer. Alternatively, the porous layer may be provided between the positive electrode and the cation exchange resin layer and between the negative electrode and the cation exchange resin layer.

The positive electrode and the negative electrode according to this embodiment may have the same configuration as in the first embodiment. Incidentally, the nonaqueous electrolyte according to this embodiment may have the same configuration as in the second embodiment.

The nonaqueous electrolyte secondary battery according to the third embodiment can be produced by the same method as in the first embodiment except that the step of setting the roughness factor of at least one surface of the cation exchange resin layer to 3 or more is carried out. That is, a method for producing the nonaqueous electrolyte secondary battery according to this embodiment includes subjecting at least one surface of the cation exchange resin layer to a roughening treatment to set the roughness factor to 3 or more before the step (4) of immersing the cation exchange resin layer in a nonaqueous electrolyte or a nonaqueous solvent.

The nonaqueous electrolyte secondary battery according to the third embodiment may have the same configuration as that of the nonaqueous electrolyte secondary battery according to the first embodiment. That is, a nonaqueous electrolyte secondary battery 1 includes a container 3, a positive electrode terminal 4, and a negative electrode terminal 5. The container 3 includes a container body that stores an electrode group 2 etc., and a lid plate being an upper wall. Incidentally, the electrode group 2, a positive electrode lead 4' and a negative electrode lead 5' are disposed inside the container body.

A plurality of nonaqueous electrolyte secondary batteries according to the third embodiment may be assembled to form the energy storage apparatus shown in FIG. 3.

Figure 4:
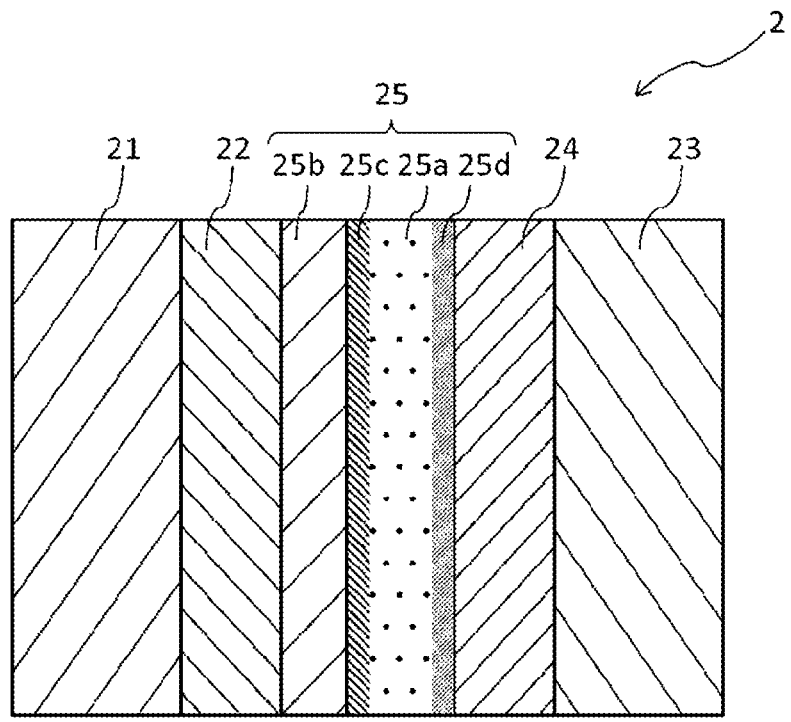
FIG. 4 is a schematic sectional view of a nonaqueous electrolyte secondary battery according to a third embodiment.

FIG. 4 is a partial schematic sectional view of the electrode group 2. In the nonaqueous electrolyte secondary battery according to the third embodiment, the electrode group 2 includes a positive electrode electrolyte 22 between a positive electrode 21 and a separator 25, and a negative electrode electrolyte 24 between a negative electrode 23 and a separator 25. The positive electrode electrolyte 22 and the negative electrode electrolyte 24 may be the same, or different. The separator 25 includes a cation exchange resin layer 25a having a first surface 25c and a second surface 25d, and a porous layer 25b. The first surface 25c and the porous layer 25b are in contact with each other. The roughness factor of the first surface 25c of the cation exchange resin layer 25a is 3 or more.

In FIG. 4, the positive electrode electrolyte 22 is disposed between the positive electrode 21 and the porous layer 25b, and the negative electrode electrolyte 24 is disposed between the negative electrode 23 and the cation exchange resin layer 25a. However, the positive electrode 21 and the porous layer 25b are impregnated with the positive electrode electrolyte 22, and the negative electrode 23 is impregnated with the negative electrode electrolyte 24, and therefore in a practical battery, the positive electrode 21 is in contact with the porous layer 25b, and the negative electrode 23 is in contact with the cation exchange resin layer 25a. That is, in the battery, the positive electrode 21, the porous layer 25b, the cation exchange resin layer 25a and the negative electrode 23 are laminated in this order.

The separator 25 has a structure in which the cation exchange resin layer 25a having a first surface 25c, and the porous layer 25b are laminated. The first surface 25c is in contact with the porous layer 25b. The cation exchange resin layer 25a contains a cation exchange resin, and inhibits lithium polysulfide $Li_2S_x$ (4≤x≤8), which is generated at the positive electrode 21 and/or contained in the positive electrode electrolyte 22, from reaching the negative electrode. Thus, lithium polysulfide generated in the positive electrode 21 and/or contained in the positive electrode electrolyte 22 is hindered from reaching the negative electrode, so that a shuttle phenomenon is suppressed.

In FIG. 4 and examples as described later, the positive electrode, the porous layer, the cation exchange resin layer and the negative electrode are arranged in this order, and the roughness factor of the first surface of the cation exchange resin layer, i.e. a surface that is in contact with the porous layer, is 3 or more. The roughness factor of the second surface, i.e. a surface that is in contact with the negative electrode, may also be 3 or more. That is, the roughness factor of each of the first surface and the second surface of the cation exchange resin layer may be 3 or more. When the roughness factor of each of both surfaces of the cation exchange resin layer is 3 or more, the interface resistance of the cation exchange resin layer can be reduced, so that the high rate discharge performance of the battery can be improved.

The positive electrode, the cation exchange resin layer, the porous layer and the negative electrode may be disposed in this order, and the roughness factor of a surface of the cation exchange resin layer, which is in contact with the porous layer, may be 3 or more. Accordingly, interface resistance between the cation exchange resin layer and the porous layer can be reduced. Incidentally, the positive electrode, the porous layer, the cation exchange resin layer, the porous layer and the negative electrode may be disposed in this order. Here, the roughness factor of each of both surfaces of the cation exchange resin layer is preferably 3 or more. Accordingly, interface resistance between the cation exchange resin layer and the porous layer can be reduced, so that the high rate discharge performance of the battery can be improved.

The positive electrode electrolyte in the nonaqueous electrolyte secondary battery according to the third embodiment may contain lithium polysulfide, and the sulfur equivalent concentration of the negative electrode electrolyte may be lower than the sulfur equivalent concentration of the positive electrode electrolyte. When the positive electrode electrolyte contains lithium polysulfide, the interface resistance of the cation exchange resin layer easily increases, but with such a configuration, interface resistance can be suppressed.

At least one of the positive electrode and the negative electrode in the nonaqueous electrolyte secondary battery according to the third embodiment may contain a cation exchange resin.

In FIG. 4 and the examples as described later, each of the cation exchange resin layer and the porous layer is a single layer, but there may be a plurality of cation exchange resin layers or porous layers. Here, all the cation exchange resin layers may be provided with the first surface having a roughness factor of 3 or more, but it suffices that at least one cation exchange resin layer is provided with the first layer. This is because the interface resistance of the cation exchange resin layer can be reduced, and the high rate discharge performance of the battery can be improved.

EXAMPLES

Hereinafter, the first to third embodiments will be described further in detail by way of examples, but the present invention is not limited to the following examples.

First Example

Example 1-1

Magnesium citrate was subjected to a carbonization treatment at 900° C. under an argon atmosphere for 1 hour, and then immersed in a 1 mol/l sulfuric acid aqueous solution to extract magnesium oxide (MgO). The residue was washed and dried to obtain porous carbon. The porous carbon and sulfur were mixed at a mass ratio of 30:70. The mixture was encapsulated in a closed vessel under an argon atmosphere, heated to 150° C. at a temperature elevation rate of 5° C./min, held for 5 hours, and then allowed to cool to 80° C. Thereafter, the mixture was heated again to 300° C. at a temperature elevation rate of 5° C./min, and held for 2 hours to be heat-treated, thereby obtaining a carbon-sulfur composite (hereinafter, also referred to as a "SPC composite").

A positive composite paste containing a SPC composite as a positive active material, acetylene black as a conductive agent, and polyvinylidene fluoride (PVDF) as a binding agent at a mass ratio of 85:5:10 and having N-methylpyrrolidone (NMP) as a solvent was prepared. The resulting positive composite paste was filled into a nickel mesh current collector, and then dried to prepare a positive electrode.

For a cation exchange resin layer, a Nafion film manufactured by Sigma-Aldrich Company was converted from a $H^+$ type to a $Li^+$ type, and used. Specifically, a $H^+$-type Nafion film was immersed in a water/alcohol solution of 1 mol/l of lithium hydroxide, and stirred at 80° C. for 12 hours to exchange protons with lithium ions. The Nafion film after stirring was washed with deionized water, and dried under vacuum at 120° C. to remove lithium hydroxide and the solvent.

The resulting $Li^+$-type Nafion film was subjected to a swelling treatment by immersing the film in a solution obtained by mixing 1,2-dimethoxyethane (DME) and 1,3-dioxolane (DOL) at a volume ratio of 50:50. Through the treatment, the Nafion film after the swelling treatment was impregnated with 20% by mass of a nonaqueous electrolyte based on the mass of the Nafion film before the swelling treatment. The thicknesses of the Nafion film before and after the swelling treatment were 50 μm and 64 μm, respectively.

As a negative electrode, one obtained by attaching metallic Li to a 10 μm-thick copper foil so that the total thickness of the negative electrode was 310 μm was used.

The positive electrode electrolyte was prepared in the following manner.

In a nonaqueous electrolyte obtained by mixing DME and DOL at a volume ratio of 50:50, lithium polysulfide ($Li_2S$) and sulfur (Sa) were added at a stoichiometric ratio (molar ratio of 8:5) allowing $Li_2S_6$ to be generated, in a glove box at a dew point of −80° C. or lower, and the mixture was stirred. The resulting solution was encapsulated in a closed container, and left standing in a thermostatic bath at 80° C. for 4 days to react $Li_2S$ and $S_8$. The resulting lithium polysulfide solution was used as a positive electrode electrolyte. In the lithium polysulfide solution, lithium polysulfide is dissolved in a sulfur equivalent concentration of 3.0 mol/l.

DME and DOL were mixed at a volume ratio of 50:50, and the mixture was used as a negative electrode electrolyte.

Figure 5:
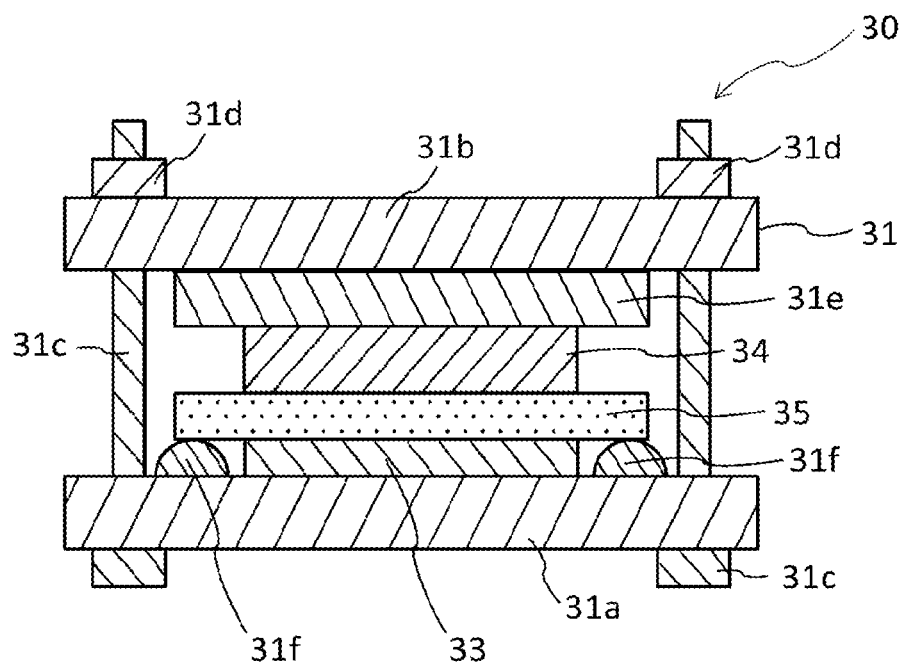
FIG. 5 is a schematic sectional view showing a configuration of a test cell used in a first example etc.

A test cell 30 was prepared using an electrochemical measurement cell 31 (manufactured by Nippon Tom Cell, Ltd.) as shown in FIG. 5. First, a positive electrode 33 prepared in the manner described above is disposed inside an O-ring 31f provided on a stainless steel plate support 31a and having an inner diameter of 26 mm and an outer diameter of 34 mm. The positive electrode electrolyte was dropped, and a cation exchange resin layer 35 having a size larger than the inner diameter of the O-ring was then disposed. On the cation exchange resin layer 35, a negative electrode 34 impregnated with a negative electrode electrolyte was disposed. A stainless steel plate electrode 31e was disposed on the negative electrode 34, a stainless steel plate lid body 31b was superposed thereon, and the electrode 31e, the negative electrode 34 and the lid body 31b were fastened together with a bolt 31c and a nut 31d to form a test cell 30 (hereinafter, also referred to as a "battery").

Example 1-2

Except that a solution of DME and DOL (50:50 (volume ratio)) containing lithium polysulfide with a sulfur equivalent concentration of 1.5 mol/l was used as a positive electrode electrolyte, the same procedure as in Example 1-1 was carried out to prepare a battery of Example 1-2.

Example 1-3

Except that a solution of DME and DOL (50:50 (volume ratio)) containing lithium polysulfide with a sulfur equivalent concentration of 3.0 mol/l, and 0.5 mol/l of lithium bis(trifluoromethanesulfonyl)imide (LiTFSI) was used as a positive electrode electrolyte, and a solution (DME:DOL=50:50) (volume ratio) containing 0.5 mol/l of lithium bis(trifluoromethanesulfonyl)imide (LiTFSI) was used as a negative electrode electrolyte, the same procedure as in Example 1-1 was carried out to prepare a battery of Example 1-3.

Example 1-4

Except that a solution of DME and DOL (50:50 (volume ratio)) containing lithium polysulfide with a sulfur equivalent concentration of 3.0 mol/l, and 1.0 mol/l of lithium bis(trifluoromethanesulfonyl)imide (LiTFSI) was used as a positive electrode electrolyte, and a solution (DME:DOL=50:50) (volume ratio) containing 1.0 mol/l of lithium bis(trifluoromethanesulfonyl)imide (LiTFSI) was used as a negative electrode electrolyte, the same procedure as in Example 1-1 was carried out to prepare a battery of Example 1-4.

Example 1-5

Magnesium citrate was subjected to a carbonization treatment at 900° C. under an argon atmosphere for 1 hour, and then immersed in a 1 mol/l of sulfuric acid aqueous solution to extract MgO. Subsequently, the residue was washed and dried to obtain porous carbon. A positive composite paste containing the porous carbon, acetylene black and PVDF at a mass ratio of 85:5:10 and having NMP as a solvent was prepared. The resulting positive composite paste was filled into a nickel mesh current collector, and then dried to prepare a positive electrode. Except that the positive electrode prepared in this way was used, the same procedure as in Example 1-1 was carried out to prepare a battery of Example 1-5.

Comparative Example 1-1

Except that a solution of DME and DOL (50:50 (volume ratio)) containing lithium polysulfide with a sulfur equivalent concentration of 3.0 mol/l, and 1.0 mol/l of lithium bis(trifluoromethanesulfonyl)imide (LiTFSI) was used as each of a positive electrode electrolyte and a negative electrode electrolyte, the same procedure as in Example 1-1 was carried out to prepare a battery of Comparative Example 1-1.

Comparative Example 1-2

Except that a solution of DME and DOL (50:50 (volume ratio)) containing 1.0 mol/l of lithium bis(trifluoromethanesulfonyl)imide (LiTFSI) was used as each of a positive electrode electrolyte and a negative electrode electrolyte, the same procedure as in Example 1-1 was carried out to prepare a battery of Comparative Example 1-2.

Comparative Example 1-3

Except that a solution of DME and DOL (50:50 (volume ratio)) was used as each of a positive electrode electrolyte and a negative electrode electrolyte, the same procedure as in Example 1-1 was carried out to prepare a battery of Comparative Example 1-3.

Comparative Example 1-4

Except that a solution of DME and DOL (50:50 (volume ratio)) containing lithium polysulfide with a sulfur equivalent concentration of 3.0 mol/l, and 1.0 mol/l of lithium bis(trifluoromethanesulfonyl)imide (LiTFSI) was used as each of a positive electrode electrolyte and a negative electrode electrolyte, and a 25 µm-thick polyethylene microporous film was used in place of the cation exchange resin layer, the same procedure as in Example 1-1 was carried out to prepare a battery of Comparative Example 1-4.

Comparative Example 1-5

Except that a solution of DME and DOL (50:50 (volume ratio)) containing lithium polysulfide with a sulfur equivalent concentration of 3.0 mol/l was used as each of a positive electrode electrolyte and a negative electrode electrolyte, and a 25 µm-thick polyethylene microporous film was used in place of the cation exchange resin layer, the same procedure as in Example 1-1 was carried out to prepare a battery of Comparative Example 1-5.

For the battery of each of Examples 1-1 to 1-5 and Comparative Examples 1-1 to 1-5, the initial discharge capacity, and the capacity retention ratio and charge-discharge efficiency at the fifth cycle were measured by the following methods.

Constant current discharge at 0.1 CA to 1.0 V was performed at 25° C. After discharge, a quiescent period of 10 minutes was provided, and constant current charge at 0.1 CA to 3.0 V was then performed at 25° C. As a condition for termination of charge and discharge, charge and discharge were terminated at the time of reaching a predetermined voltage or elapse of 10 hours. That is, the charge-discharge condition in this example is that of a so-called charge-discharge test with a capacity limiting condition in which when a certain amount of electricity is fed, charge or discharge is terminated even if the voltage does not reach an end-of-charge voltage or an end-of-discharge voltage. The value obtained by dividing the discharge capacity at this time by the mass of a positive active material contained in a positive composite layer was defined as an initial discharge capacity.

For the battery of each of Examples 1-1 to 1-4 and Comparative Examples 1-1 to 1-4, the value of 1 CA was defined as a current value at which the capacity of a positive active material contained in a positive electrode is discharged in an hour where the capacity per mass of the positive active material is 1675 mAh/g, a theoretical capacity per mass of sulfur. For the battery of Example 1-5, 1 CA was a current value at which the current per mass of porous carbon contained in a positive electrode was 1000 mA/g.

With the discharge and charge step as one cycle, the cycle was repeated six times. The cycle capacity retention ratio was calculated by dividing the discharge capacity at the fifth cycle by the initial discharge capacity. Incidentally, the charge-discharge efficiency at the fifth cycle was calculated by dividing the discharge capacity at the sixth cycle by the charge capacity at the fifth cycle.

Table 1 shows the cycle capacity retention ratio and charge-discharge efficiency after five cycles for the battery of each of Examples 1-1 to 1-5 and Comparative Examples 1-1 to 1-5.

TABLE 1

| | | Positive electrode electrolyte | | Separator | | Negative electrode electrolyte | | Initial discharge capacity/ mAh/g | Charge-discharge efficiency at fifth cycle/% | Cycle capacity retention ratio/% |
|---|---|---|---|---|---|---|---|---|---|---|
| | Positive active material | Lithium salt concentration/ mol/l | Sulfur equivalent concentration/ mol/l | Cation exchange resin layer | Porous film | Lithium salt concentration/ mol/l | Sulfur equivalent concentration/ mol/l | | | |
| Example 1-1 | SPC composite | 0 | 3.0 | Nafion film | None | 0 | 0 | 1168 | 100 | 100 |
| Example 1-2 | SPC composite | 0 | 1.5 | Nafion film | None | 0 | 0 | 887 | 101 | 114 |
| Example 1-3 | SPC composite | 0.5 | 3.0 | Nafion film | None | 0.5 | 0 | 691 | 103 | 100 |
| Example 1-4 | SPC composite | 1.0 | 3.0 | Nafion film | None | 1.0 | 0 | 1166 | 102 | 100 |
| Example 1-5 | Porous carbon | 0 | 3.0 | Nafion film | None | 0 | 0 | Amount corresponding to capacity limiting | 100 | 100 |

TABLE 1-continued

| | | Positive electrode electrolyte | | Separator | | Negative electrode electrolyte | | | | |
|---|---|---|---|---|---|---|---|---|---|---|
| | | Lithium salt | Sulfur equivalent | | | Lithium salt | Sulfur equivalent | Initial | Charge-discharge | Cycle |
| | Positive active material | concentration/ mol/l | concentration/ mol/l | Cation exchange resin layer | Porous film | concentration/ mol/l | concentration/ mol/l | discharge capacity/ mAh/g | efficiency at fifth cycle/% | capacity retention ratio/% |
| Comparative Example 1-1 | SPC composite | 1.0 | 3.0 | Nafion film | None | 1.0 | 3.0 | — | Charge-discharge impossible | Charge-discharge impossible |
| Comparative Example 1-2 | SPC composite | 1.0 | 0 | Nafion film | None | 1.0 | 0 | 653 | 101 | 82.7 |
| Comparative Example 1-3 | SPC composite | 0 | 0 | Nafion film | None | 0 | 0 | 509 | 95.4 | 71.6 |
| Comparative Example 1-4 | SPC composite | 1.0 | 3.0 | None | PE film | 1.0 | 3.0 | 1168 | 90.4 | 90.1 |
| Comparative Example 1-5 | SPC composite | 0 | 3.0 | None | PE film | 0 | 3.0 | 1168 | 70.5 | 72.4 |

As is apparent from Table 1, the batteries of Examples 1-1 to 1-5 showed a value of 100% or more for the cycle capacity retention ratio and the coulombic efficiency after five cycles, and evidently had excellent cycle performance. This may be because as a result of using a cation exchange resin layer as a separator, lithium polysulfide contained in the positive electrode electrolyte did not reach the negative electrode, and thus self discharge was suppressed; and the positive electrode electrolyte contained lithium polysulfide with a sulfur equivalent concentration of 1.5 mol/l or more in advance, and therefore lithium polysulfide generated in the positive electrode was inhibited from being dissolved in the positive electrode electrolyte. The battery of Example 1-5 in which the positive composite layer did not contain sulfur exhibited high cycle performance. Therefore, it is apparent that lithium polysulfide contained in the positive electrode electrolyte also contributes to the charge-discharge reaction. For the battery of Example 1-5, it was not possible to calculate the initial discharge capacity because the positive composite layer did not contain a positive active material, but even after elapse of ten hours from the start of discharge, it was possible to discharge the battery without reaching an end-of-discharge voltage. That is, it can be said that lithium polysulfide contained in the positive electrode electrolyte reacted, so that it was able to obtain a high discharge capacity.

On the other hand, in Comparative Example 1-1 where a solution containing 1.0 mol/l of a lithium salt, and lithium polysulfide with a sulfur equivalent concentration of 3.0 mol/l was used for each of the positive electrode electrolyte and the negative electrode electrolyte (nonaqueous electrolytes), and a cation exchange film was used for the separator, the battery had high resistance, so that the voltage reached an end-of-charge-discharge voltage immediately after the start of charge-discharge, and therefore it was not possible to perform charge-discharge. This may be because there is a difference in lithium ion conduction mechanism between the nonaqueous electrolyte and the cation exchange film. That is, in the cation exchange film, the transport number of lithium ions is 1 because an anion and lithium polysulfide do not move, and only lithium ions move. On the other hand, in the positive electrode electrolyte and the negative electrode electrolyte, three species: lithium ions, an anion and lithium polysulfide move, and therefore the transport number of lithium ions is smaller than the transport number of lithium ions in the cation exchange film. When there exist regions having different ion conduction mechanisms as described above, resistance increases at the interface between the regions. It is considered that in the battery of Comparative Example 1-1, such an interface existed at two positions, i.e. between the positive electrode and the separator and between the negative electrode and the separator. Therefore, interface resistance markedly increased, so that it was not possible to perform charge-discharge.

The batteries of Comparative Examples 1-2 and 1-3 in which the positive electrode electrolyte did not contain lithium polysulfide had a low capacity retention ratio after five cycles. This may be because lithium polysulfide generated in the positive electrode was dissolved in the positive electrode electrolyte.

Incidentally, in the batteries of Comparative Examples 1-4 and 1-5 which were not provided with the cation exchange resin layer, the values of both the cycle capacity retention ratio and the coulomb efficiency after five cycles were low. When the cation exchange resin layer is not provided, interface resistance between the separator and the positive electrode or the negative electrode is small, but lithium polysulfide contained in the nonaqueous electrolyte is reduced at the negative electrode, resulting in occurrence of a shuttle phenomenon in which self discharge progresses. Thus, it is supposed that the coulomb efficiency was reduced, and the cycle capacity retention ratio was also reduced.

Second Example (Preliminary Experiment)

Figure 6:
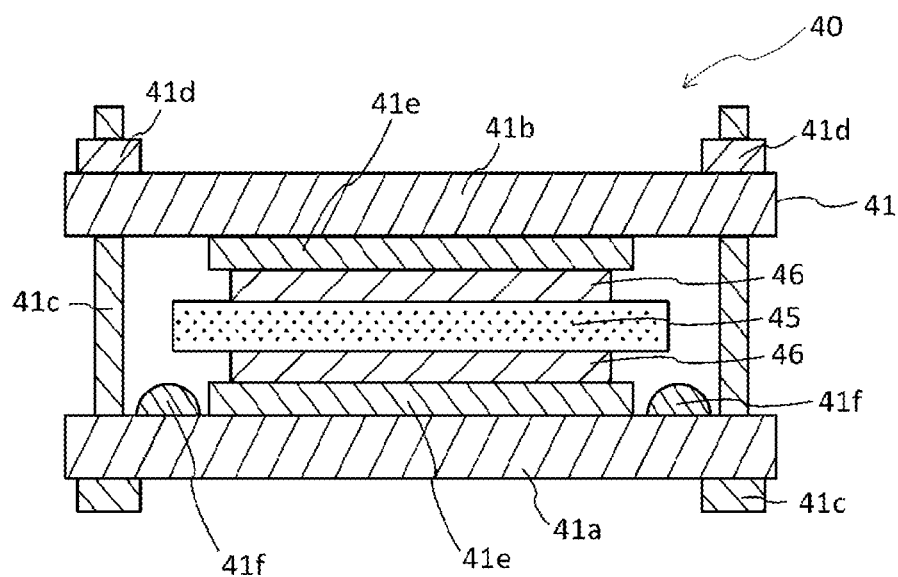
FIG. 6 is a schematic sectional view showing a configuration of a resistance measuring cell used in a second example.

By the following method, the interface resistance of a cation exchange resin layer was measured while the concentration of an anion in a nonaqueous electrolyte was changed. A resistance measurement cell 40 was prepared using an electrochemical measurement cell 41 (manufactured by Nippon Tom Cell, Ltd.) as shown in FIG. 6. Inside an O-ring 41f provided on a stainless steel plate support 41a and having an inner diameter of 26 mm and an outer diameter of 34 mm, a stainless steel plate electrode 41e and a porous film (porous layer) 46 were laminated so as to sandwich a cation exchange resin layer 45 therebetween. A stainless steel plate lid body 41b was superposed on the layered product, and the laminate and the lid body 41b were fastened together with a bolt 41c and a nut 41d to form a resistance measurement cell 40. For the porous film 46, 25

μm-thick polyethylene microporous films impregnated with nonaqueous electrolyte with various lithium salt concentrations were used. For the cation exchange resin layer 45, a Nafion film (manufactured by Sigma-Aldrich Company) impregnated with a mixed solvent obtained by mixing 1,2-dimethoxyethane (DME) and 1,3-dioxolane (DOL) at a volume ratio of 50:50 was used. The thicknesses of the Nafion film before and after impregnation of the solution were 50 and 64 μm, respectively. The lithium salt concentrations of the nonaqueous electrolytes to be impregnated into the porous film 46 were set to 0.01, 0.1, 0.5, 0.7 and 1.0 mol/l, lithium bis(trifluoromethanesulfonyl)imide (LiTFSI) was used as a lithium salt, and a mixture obtained by mixing 1,2-dimethoxyethane (DME) and 1,3-dioxolane (DOL) at a volume ratio of 50:50 was used as a nonaqueous solvent.

Using the resistance measurement cell, electrolyte layer resistance R was measured by a.c. impedance measurement. The a.c. impedance measurement was performed at an applied voltage amplitude of 5 mV and a frequency of 1 MHz to 100 mHz. A Nyquist diagram of measurement results was prepared, and fitting was performed using an equivalent circuit. Among the intersections of a real axis and a curve obtained by fitting a circular arc appearing on the highest frequency side, the value of an interaction on the low frequency side was read, and defined as electrolyte resistance R. The electrolyte layer resistance R includes porous layer resistance Re that is the resistance of the polyethylene microporous film; interface resistance Ri that is the resistance of the interface between the polyethylene microporous film and the cation exchange film after the impregnation treatment; and cation exchange resin layer resistance Re that is the resistance of the cation exchange film after the impregnation treatment. The electrolyte layer resistance R is expressed by the following formula (1).

$$R = 2Re + 2Ri + Rc \quad (1)$$

Next, a resistance measurement cell was prepared by impregnating a 50 μm-thick Nafion film with the mixed solvent, and sandwiching the Nafion film between stainless steel plates without disposing a polyethylene microporous film, and a.c. impedance measurement was performed by the same method as described above. The resistance determined by the measurement was defined as cation exchange resin layer resistance Rc.

Resistance measurement cells were prepared by impregnating polyethylene microporous films containing nonaqueous electrolytes containing 1,2-dimethoxyethane (DME) and 1,3-dioxolane (DOL) at a volume ratio of 50:50, and having lithium bis(trifluoromethanesulfonyl)imide (LiTFSI) concentrations of 0.01 mol/l, 0.1 mol/l, 0.5 mol/l, 0.7 mol/l and 1.0 mol/l, respectively, and a.c. impedance measurement was performed by the same method as described above. The resistance determined by the measurement was defined as porous layer resistance Re.

From the values of electrolyte layer resistance R, cation exchange resin layer resistance Rc and porous layer resistance Re each determined by a.c. impedance measurement, interface resistance Ri at each lithium salt concentration was calculated using the formula (1). The ratio (%) of interface resistance at each lithium salt concentration was determined where the value of interface resistance Ri at a lithium salt concentration of 1.0 mol/l is 100%. The results are shown in Table 2.

TABLE 2

| Lithium salt concentration/ mol/l | Interface resistance ratio/ % |
|---|---|
| 1 | 100 |
| 0.7 | 18.1 |
| 0.5 | 4.31 |
| 0.1 | 4.23 |
| 0.01 | 2.44 |
| 0 | 0.43 |

It was found that when the lithium salt concentration was 0.7 mol/l or less, resistance between electrodes with the cation exchange resin layer interposed therebetween was markedly reduced as shown in Table 2. That is, it is supposed that when the lithium salt is contained in an amount of more than 0.7 mol/l, interface resistance with the cation exchange resin layer increases, leading to an increase in resistance associated with the charge-discharge reaction of the battery.

Example 2-1

Magnesium citrate was subjected to a carbonization treatment at 900° C. under an argon atmosphere for 1 hour, and then immersed in a 1 mol/l of sulfuric acid aqueous solution to extract MgO. Subsequently, the residue was washed and dried to obtain porous carbon. The porous carbon and sulfur were mixed at a mass ratio of 30:70. The mixture was encapsulated in a closed vessel under an argon atmosphere, heated to 150° C. at a temperature elevation rate of 5° C./min, held for 5 hours, and then allowed to cool to 80° C. Thereafter, the mixture was heated again to 300° C. at a temperature elevation rate of 5° C./min, and held for 2 hours to be heat-treated, thereby obtaining a carbon-sulfur composite (hereinafter, also referred to as a "SPC composite").

$H^+$-type Nafion was converted to $Li^+$-type Nafion by adding a 1 mol/l lithium hydroxide aqueous solution to a water/alcohol solution (20%) of Nafion manufactured by Sigma-Aldrich Company until the pH of the solution was 7.35. The content of $Li^+$-type Nafion in this solution was 16.6 mass %. NMP was added to the water/alcohol solution of $Li^+$-type Nafion, and the mixture was heated to prepare a NMP solution containing 5 mass % of $Li^+$-type Nafion.

Using a carbon-sulfur composite prepared by the above-mentioned method and a NMP solution of $Li^+$-type Nafion (solid content: 5% by mass), a positive composite paste containing a carbon-sulfur composite as a positive active material, acetylene black as a conductive aid, and Nafion as a binding agent at a mass ratio of 85:5:10 was prepared. Ultrasonic dispersion and vacuum impregnation were performed in mixing. The resulting positive composite paste was filled into a Ni mesh current collector, and then dried to prepare a positive electrode mixed with $Li^+$-type Nafion. The resulting positive electrode had a thickness of about 80 μm.

As a negative electrode, one obtained by attaching metallic Li to a 10 μm-thick copper foil so as to attain a thickness of 310 μm was used. For the positive electrode electrolyte and the negative electrode electrolyte, a solution obtained by mixing 1,2-dimethoxyethane (DME) and 1,3-dioxolane (DOL) at a volume ratio of 50:50 was used. For a cation exchange resin layer, a $H^+$-type Nafion film (manufactured by Sigma-Aldrich Company) was converted to a $Li^+$-type, and then subjected to a swelling treatment with the positive electrode electrolyte. By this treatment, the amount of the positive electrode electrolyte impregnated into the Nafion film was 20% by mass based on the mass of the Nafion film. The thicknesses of the Nafion film before and after the swelling treatment were 50 μm and 64 μm, respectively.

A test cell (hereinafter, also referred to as a "battery") having the configuration shown in FIG. 5 was prepared using the positive electrode, the negative electrode, the cation exchange resin layer, the positive electrode electrolyte and the negative electrode electrolyte.

Example 2-2

A carbon-sulfur composite as a positive active material, acetylene black as a conductive aid, and PVDF as a binding agent were mixed at a mass ratio of 85:5:10, and NMP was used as a solvent to prepare a positive electrode paste. Ultrasonic dispersion and vacuum impregnation were performed in mixing. The resulting positive electrode paste was filled into a Ni mesh current collector, and dried.

$H^+$-type Nafion was converted to $Li^+$-type Nafion by adding a 1 mol/l lithium hydroxide aqueous solution to a water/ethanol solution (20%) of Nafion manufactured by Sigma-Aldrich Company until the pH of the solution was 7.35. The content of Li-type Nafion in this solution was 16.6 mass %. The water/alcohol solution of a $Li^+$-type Nafion ionomer was diluted by adding a water/alcohol mixture until the solid content was 5% by mass, thereby preparing a water/alcohol solution of a $Li^+$-type Nafion ionomer. The water/alcohol solution of a $Li^+$-type Nafion ionomer was dropped so that the amount of $Li^+$-type Nafion was 112.5% by mass based on the mass of the positive composite layer, thereby impregnating the water/alcohol solution into the positive composite layer. A drying treatment was performed at 100° C. for 12 hours to obtain a positive electrode coated with $Li^+$-type Nafion. The resulting positive electrode had a thickness of about 80 μm.

Except that the above-mentioned positive electrode was used, the same procedure as in Example 2-1 was carried out to prepare a battery of Example 2-2.

Comparative Example 2-1

Except that as a binding agent, polyvinylidene fluoride (PVDF) was used in place of Nafion, the same procedure as in Example 2-1 was carried out to prepare a battery of Comparative Example 2-1.

Comparative Example 2-2

Except that a 25 μm-thick polyethylene microporous film impregnated with a solution of DME and DOL (50:50 (volume ratio)) containing 1.0 mol/l of lithium bis(trifluoromethanesulfonyl)imide (LiTFSI) as a negative electrode electrolyte was disposed between a negative electrode and a cation exchange resin layer, and the positive electrode electrolyte had a composition identical to the negative electrode electrolyte, the same procedure as in Comparative Example 2-1 was carried out to prepare a battery of Comparative Example 2-2.

Comparative Example 2-3

The same positive electrode as in Example 2-2 was used. Metallic Li was used for a negative electrode. In place of the cation exchange resin layer, a 25 μm-thick polyethylene microporous film impregnated with a nonaqueous electrolyte of DME and DOL (50:50 (volume ratio)) containing 1 mol/l of LiTFSI was used. The amount of the nonaqueous electrolyte to be impregnated was 20% by mass based on the mass of the polyethylene microporous film.

Using the positive electrode, the negative electrode, and the polyethylene microporous film, a lithium ion secondary battery was prepared in the same manner as in Example 2-1.

Comparative Example 2-4

Except that a Nafion film was used as a cation exchange resin layer, the Nafion film was subjected to a swelling treatment, and a solution of DME and DOL (50:50 (volume ratio)) containing 1 mol/l of LiTFSI was used as a positive electrode electrolyte, the same procedure as in Comparative Example 2-1 was carried out to prepare a battery of Comparative Example 2-4.

For the battery of each of Example 2-1 and Comparative Examples 2-1 to 2-4, the initial discharge capacity, and the charge-discharge efficiency at the fifth cycle were measured by the following methods.

Constant current discharge at 0.1 CA to 1.0 V was performed at 25° C. After discharge, a quiescent period of 10 minutes was provided, and constant current charge at 0.1 CA to 3.0 V was then performed at 25° C. As a condition for termination of charge and discharge, charge and discharge were terminated at the time of elapse of 10 hours. The value obtained by dividing the discharge capacity at the first cycle by the mass of a positive active material was defined as an initial discharge capacity. The average closed circuit voltage during discharge at the first cycle was determined as an initial average discharge voltage.

The value of 1 CA was defined as a current value at which the capacity of a positive active material is discharged in an hour where the capacity of the positive active material is 1675 mAh/g, a theoretical capacity of sulfur.

With the discharge and charge step as one cycle, the cycle was repeated six times. The charge-discharge efficiency at the fifth cycle was calculated by dividing the discharge capacity at the sixth cycle by the charge capacity at the fifth cycle. Further, the cycle capacity retention ratio was calculated by dividing the discharge capacity at the fifth cycle by the discharge capacity at the first cycle.

The initial discharge capacity, the charge-discharge efficiency at the fifth cycle and the cycle capacity retention ratio for each of the batteries of Examples 2-1 to 2-2 and Comparative Examples 2-1 to 2-4, and the initial average discharge voltage for each the batteries of Examples 2-1 and 2-2 and Comparative Example 2-4 are shown in Table 3.

TABLE 3

| | Cation exchange resin of positive electrode | Li salt concentration of positive electrode electrolyte/ mol/l | Cation exchange resin layer | Porous film | Li salt concentration of negative electrode electrolyte/mol/l | Initial discharge capacity/ mAh/g | Charge-discharge efficiency at fifth cycle/% | Five-cycle capacity retention ratio/% | Initial average discharge voltage/V |
|---|---|---|---|---|---|---|---|---|---|
| Example 2-1 | Mixing | 0 | Nafion film | None | 0 | 693 | 98.2 | 69.6 | 1.98 |
| Example 2-2 | Coating | 0 | Nafion film | None | 0 | 743 | 98.2 | 79.1 | 1.93 |
| Comparative Example 2-1 | None | 0 | Nafion film | None | 0 | 509 | 95.4 | 71.6 | — |

TABLE 3-continued

|  | Cation exchange resin of positive electrode | Li salt concentration of positive electrode electrolyte/ mol/l | Cation exchange resin layer | Porous film | Li salt concentration of negative electrode electrolyte/mol/l | Initial discharge capacity/ mAh/g | Charge-discharge efficiency at fifth cycle/% | Five-cycle capacity retention ratio/% | Initial average discharge voltage/V |
|---|---|---|---|---|---|---|---|---|---|
| Comparative Example 2-2 | None | 1.0 | Nafion film | PE film | 1.0 | 38 | — | 6.6 | — |
| Comparative Example 2-3 | Coating | 1.0 | None | PE film | 1.0 | 781 | 66.6 | 65.0 | — |
| Comparative Example 2-4 | None | 1.0 | Nafion film | None | 1.0 | 653 | 101 | 82.7 | 1.53 |

As shown in Table 3, a battery containing a cation exchange resin in the positive electrode, and including a cation exchange resin layer was excellent in initial discharge capacity, charge-discharge efficiency at the fifth cycle, and initial average discharge voltage. In particular, the battery of Example 2-2 in which the positive electrode was coated with a cationic resin was excellent in initial discharge capacity and cycle capacity retention ratio. A high average discharge voltage means that high energy density is exhibited.

On the other hand, the battery of Comparative Example 2-1 which did not contain a cation exchange resin in the positive electrode had a low initial discharge capacity and low charge-discharge efficiency at the fifth cycle. It was almost impossible to charge and discharge the battery of Comparative Example 2-2 in which the positive electrode did not contain a cation exchange resin, and the polyethylene microporous film was impregnated with a nonaqueous electrolyte containing 1 mol/l of LiTFSI. The battery of Comparative Example 2-3 in which the positive electrode contained a cation exchange resin, and a polyethylene microporous film was provided in place of a cation exchange resin layer had low charge-discharge cycle performance, and a charge-discharge efficiency of 66.6% at the fifth cycle. The battery of Comparative Example 2-4 in which the positive electrode did not contain a cation exchange resin, and the cation exchange resin layer was impregnated with a nonaqueous electrolyte containing 1 mol/l of LiTFSI did not exhibit a sufficient discharge capacity, and had a low average discharge voltage.

The mechanism that when at least one of the positive electrode and the negative electrode contains a cation exchange resin, a cation exchange resin layer is provided, and the concentration of an anion contained in the nonaqueous electrolyte is 0.7 mol/l or less, a high initial discharge capacity and high charge-discharge efficiency can be obtained is considered as follows.

The cation exchange resin allows only a cation to pass therethrough, and hinders passage of an anion. Therefore, the transport number of lithium ions in the cation exchange resin is approximately 1. That is, the cation exchange resin is a single ion conductor. Meanwhile, in a nonaqueous electrolyte containing a lithium salt, both the lithium ion and the counter anion move, so that the transport number of lithium ions is not 1, and thus the nonaqueous electrolyte is not a single ion conductor. When the lithium salt concentration is low, i.e. the anion concentration is low, resistance between the cation exchange film and the separator is low as shown in the preliminary experiment. This may be because there is little considerable difference between the lithium ion transport number in the cationic resin being a single ion conductor and the lithium ion transport number in the polyethylene microporous film containing a nonaqueous electrolyte. On the other hand, it is supposed that when the lithium salt concentration was higher than 0.7 mol/l, the lithium ion transport number in the polyethylene microporous film containing a nonaqueous electrolyte decreased, and therefore regions having different lithium ion transport numbers were generated, so that resistance increased.

In Examples 2-1 and 2-2, at least one of the positive electrode and the negative electrode, and the separator contained a cation exchange resin, the nonaqueous electrolyte had a low anion concentration of 0.7 mol/l or less, a single ion conductor was therefore considered to almost the whole area between the positive electrode and the negative electrode, and the lithium ion transport number was constantly high, so that it was possible to obtain high charge-discharge efficiency and a high discharge capacity. In the meantime, it is supposed that in the batteries of Comparative Examples 2-2 to 2-4, a region having a high lithium ion transport number and a low lithium ion transport number were present between the positive electrode and the negative electrode, and therefore resistance increased at an interface where lithium ions were given and received, so that it was not possible to achieve both a high initial discharge capacity and high charge-discharge efficiency.

Third Example (Preliminary Experiment)

By the following method, the interface resistance of a porous film and a cation exchange resin layer was measured while the concentration of lithium polysulfide in a nonaqueous electrolyte impregnated into a porous film was changed. For the measurement, a resistance measurement cell 40 shown in FIG. 6 was used. For the porous film 46, 25 μm-thick polyethylene microporous films impregnated with lithium polysulfide solutions with various sulfur equivalent concentrations were used. For a cation exchange resin layer 45, a Nafion film (manufactured by Sigma-Aldrich Company) impregnated with a mixed solvent of 1,2-dimethoxyethane (DME) and 1,3-dioxolane (DOL) (volume ratio: 50:50) was used. The thicknesses of the Nafion film before and after impregnation of the mixed solvent were 50 and 64 μm, respectively. The sulfur equivalent concentrations of the lithium polysulfide solutions were set to 3.0 mol/l, 6.0 mol/l, 12.0 mol/l and 18.0 mol/l. As a nonaqueous solvent contained in the lithium polysulfide solution, a mixture of 1,2-dimethoxyethane (DME) and 1,3-dioxolane (DOL) (volume ratio: 50:50) was used.

When the composition of the nonaqueous electrolyte to be impregnated into the porous film was changed as shown in Table 4, a resistance measurement cell was prepared in the same manner as described above.

The a.c. impedance measurements were performed for these resistance measurement cells. The measurement was performed at an applied voltage amplitude of 5 mV and a frequency of 1 MHz to 100 mHz. Interface resistance was calculated in the same manner as in the preliminary experiment in the second example. The calculation results are shown in Table 4.

TABLE 4

| Lithium salt concentration/ mol/l | Sulfur equivalent concentration/ mol/l | Resistance/ Ohm |
|---|---|---|
| 0 | 18.0 | $3.03 \times 10^4$ |
| 0 | 12.0 | $2.89 \times 10^3$ |
| 0 | 6.0 | 88.6 |
| 0 | 3.0 | 50.8 |
| 0.3 | 18.0 | $1.13 \times 10^4$ |
| 0.3 | 12.0 | $6.38 \times 10^3$ |
| 0.3 | 6.0 | 209 |
| 0.3 | 3.0 | 74.7 |
| 0.3 | 0 | 63.5 |

From Table 4, it is apparent that when the sulfur equivalent concentration of the lithium polysulfide solution is more than 12.0 mol/l, interface resistance markedly increases. It has been evident that at a sulfur equivalent concentration of 12 mol/l or less, interface resistance is lower when LiTFSI is not included, but at a sulfur equivalent concentration of more than 12 mol/l, interface resistance is reduced when LiTFSI is contained.

Example 3-1

Magnesium citrate was subjected to a carbonization treatment at 900° C. under an argon atmosphere for 1 hour, and then immersed in a 1 mol/l of sulfuric acid aqueous solution to extract MgO. The residue was washed and dried to obtain porous carbon. The porous carbon and sulfur were mixed at a mass ratio of 30:70. The mixture was encapsulated in a closed vessel under an argon atmosphere, heated to 150° C. at a temperature elevation rate of 5° C./min, held for 5 hours, and then allowed to cool to 80° C. Thereafter, the mixture was heated again to 300° C. at a temperature elevation rate of 5° C./min, and held for 2 hours to be heat-treated, thereby obtaining a carbon-sulfur composite (hereinafter, also referred to as a SPC composite).

A positive composite paste containing a SPC composite as a positive active material, acetylene black as a conductive agent, and polyvinylidene fluoride (PVDF) as a binding agent at a mass ratio of 85:5:10 and having N-methylpyrrolidone (NMP) as a solvent was prepared. The resulting positive composite paste was filled into a nickel mesh current collector, and then dried to prepare a positive electrode.

For a cation exchange resin layer, a Nafion film manufactured by Sigma-Aldrich Company was converted from a H$^+$ type to a Li$^+$ type, and used. Specifically, a H$^+$-type Nafion film was immersed in a water/alcohol solution of 1 mol/l of lithium hydroxide, and stirred at 80° C. for 12 hours to exchange protons with lithium ions. The Nafion film after stirring was washed with deionized water, and dried under vacuum at 120° C. to remove lithium hydroxide and the solvent.

The resulting Li$^+$-type Nafion film was subjected to a swelling treatment by immersing the film in a solution obtained by mixing 1,2-dimethoxyethane (DME) and 1,3-dioxolane (DOL) at a volume ratio of 50:50. Through the treatment, the Nafion film after the swelling treatment was impregnated with 20% by mass of a nonaqueous electrolyte based on the mass of the Nafion film before the swelling treatment. The thicknesses of the Nafion film before and after the swelling treatment were 50 µm and 64 µm, respectively.

As a negative electrode, one obtained by attaching metallic Li to a 10 µm-thick copper foil so that the total thickness of the negative electrode was 310 µm was used.

The positive electrode electrolyte was prepared in the following manner.

In a nonaqueous electrolyte obtained by mixing DME and DOL at a volume ratio of 50:50, lithium polysulfide (Li$_2$S) and sulfur (S$_8$) were added at a stoichiometric ratio (molar ratio of 8:5) allowing Li$_2$S$_6$ to be generated, in a glove box at a dew point of −80° C. or lower, and the mixture was stirred. The resulting solution was encapsulated in a closed container, and left standing in a thermostatic bath at 80° C. for 4 days to react Li$_2$S and S$_8$. The resulting lithium polysulfide solution was used as a positive electrode electrolyte. In the lithium polysulfide solution, lithium polysulfide is dissolved in a sulfur equivalent concentration of 3.0 mol/l.

As a negative electrode electrolyte, a mixed solution of DME and DOL (volume ratio: 50:50) containing 0.3 mol/l of LiTFSI was used.

Figure 7:
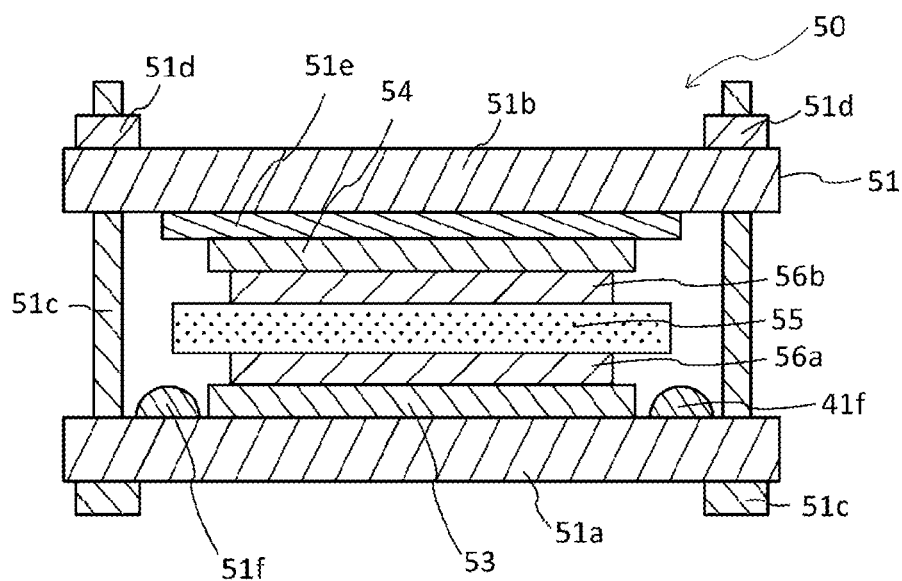
FIG. 7 is a schematic sectional view showing a configuration of a test cell used in a third example.

A test cell 50 was prepared using an electrochemical measurement cell 51 (manufactured by Nippon Tom Cell, Ltd.) as shown in FIG. 7. First, a positive electrode 53 prepared in the manner described above is disposed inside an O-ring 51*f* provided on a stainless steel plate support 51*a* and having an inner diameter of 26 mm and an outer diameter of 34 mm. A porous film (porous layer) 56*a* impregnated with a positive electrode electrolyte was laminated, and a cation exchange resin layer 35 having a size larger than the inner diameter of the O-ring was then disposed. On the cation exchange resin layer 35, a porous film 56*b* impregnated with a negative electrode electrolyte was disposed, and a negative electrode 54 was laminated. A stainless steel plate electrode 51*e* was disposed on the negative electrode 54, a stainless steel plate lid body 51*b* was superposed thereon, and the electrode 51*e*, the negative electrode 54 and the lid body 51*b* were fastened together with a bolt 51*c* and a nut 51*d* to form a test cell 50 (hereinafter, also referred to as a "battery"). For each of porous films 56*a* and 56*b*, a 25 µm-thick polyethylene microporous film was used.

Examples 3-2 to 3-6

Except that the sulfur equivalent concentration of the positive electrode electrolyte and the concentration of LiTFSI were changed as shown in Table 5, the same procedure as in Example 3-1 was carried out to prepare batteries of Examples 3-2 to 3-6.

Comparative Example 3-1

Except that the sulfur equivalent concentration of the positive electrode electrolyte was 0 mol/l, and the concentration of LiTFSI was 0.3 mol/l, the same procedure as in Example 3-1 was carried out to prepare a battery of Comparative Example 3-1.

For the battery of each of Examples 3-1 to 3-6 and Comparative Example 3-1, the initial discharge capacity, and the capacity retention ratio and charge-discharge efficiency at the fifth cycle were measured by the following methods.

Constant current discharge at a discharge current of 0.1 CA with an end-of-discharge voltage of 1.0 V was performed at 25° C. After discharge, a quiescent period of 10 minutes was provided, and constant current charge at a charge current of 0.1 CA with an end-of-charge voltage of 3.0 was performed at 25° C. The value obtained by dividing the discharge capacity at the first cycle by the mass of a positive active material contained in a positive composite layer was defined as an initial discharge capacity. Incidentally, an initial sulfur utilization factor was calculated by dividing the discharge capacity at the first cycle by the mass of sulfur contained in the positive composite layer and the positive electrode electrolyte, and then dividing the resulting value by 1675 mAh/g, a theoretical capacity of sulfur.

The value of 1 CA was defined as a current value at which the capacity of a positive active material contained in a positive composite layer is discharged in an hour where the capacity per mass of the positive active material contained in the positive composite layer is 1675 mAh/g, a theoretical capacity per mass of sulfur.

With the discharge and charge steps as one cycle, a charge/discharge cycle test was conducted in which this cycle was repeated 6 cycles. The cycle capacity retention ratio was calculated by dividing the discharge capacity at the fifth cycle by the discharge capacity at the first cycle. For Examples 3-4 and 3-6 and Comparative Example 3-1, a charge-discharge cycle test was not conducted. The measurement results are shown in Table 5.

TABLE 5

|  | Positive electrode electrolyte | | Li salt concentration of negative electrode electrolyte/mol/l | Initial discharge capacity/ mAh/g | Cycle capacity retention ratio/% | Initial sulfur utilization ratio/% |
| --- | --- | --- | --- | --- | --- | --- |
|  | Lithium salt concentration/mol/l | Sulfur equivalent concentration/mol/l |  |  |  |  |
| Example 3-1 | 0 | 3.0 | 0.3 | 2245 | 80.9 | 74.6 |
| Example 3-2 | 0 | 6.0 | 0.3 | 3182 | 82.5 | 96.7 |
| Example 3-3 | 0 | 12.0 | 0.3 | 4472 | 80.2 | 56.5 |
| Example 3-4 | 0.3 | 3.0 | 0.3 | 1955 | — | 67.2 |
| Example 3-5 | 0.3 | 6.0 | 0.3 | 2107 | 82.3 | 47.7 |
| Example 3-6 | 0.3 | 12.0 | 0.3 | 3848 | — | 46.5 |
| Comparative Example 3-1 | 0.3 | 0.0 | 0.3 | 943 | — | 83.9 |

As shown in Table 5, the initial discharge capacity increased as the sulfur equivalent concentration of the positive electrode electrolyte was increased. However, the initial sulfur utilization factor indicating a utilization factor of sulfur contained in the positive composite layer and the positive electrode electrolyte was maximized when the sulfur equivalent concentration of the positive electrode electrolyte is 6.0 mol/l, and the sulfur utilization factor decreased when the sulfur equivalent concentration was more than 6.0 mol/l. The value of the cycle capacity retention ratio was also high when the sulfur equivalent concentration was 12.0 mol/l. In Examples 3-4 to 3-6 where the positive electrode electrolyte contained 0.3 mol/l of LiTFSI, the values of both the initial discharge capacity and the initial sulfur utilization factor were lower as compared to Examples 3-1 to 3-3 in which the positive electrode electrolyte did not contain LiTFSI. This is well consistent with the tendency of interface resistance shown in Table 4. The above results show that when the positive electrode electrolyte contains lithium polysulfide, the lithium salt concentration is preferably less than 0.3 mol/l, and the sulfur equivalent concentration is preferably 3.0 to 12.0 mol/l.

Fourth Example

Example 4-1

Both surfaces of a 50 µm-thick Nafion film (manufactured by Sigma-Aldrich Company) as a cation exchange film being one example of a cation exchange resin layer were subjected to a roughening treatment using a # P320 sandpaper in which a polishing agent for polished cloth and paper has a grain size of 320 µm as specified in JIS R 6010:2000. One surface was polished with the sandpaper eighty times. This film is defined as a cation exchange film in Example 4-1.

Example 4-2

Except that the # P400 sandpaper was used, the same procedure as in Example 4-1 was carried out to subject a Nafion film to a roughening treatment. This film is defined as a cation exchange film in Example 4-2.

Example 4-3

Except that the # P1000 sandpaper was used, the same procedure as in Example 4-1 was carried out to subject a Nafion film to a roughening treatment. This film is defined as a cation exchange film in Example 4-3.

Examples 4-4 to 4-6

Except that the number of times the surface was polished with a sandpaper was changed to set the roughness factor, the arithmetic mean roughness Ra and the maximum height roughness Rz to values as shown in Table 6, the same procedure as in Example 4-3 was carried out to prepare cation exchange films of Examples 4-4 to 4-6.

Comparative Example 4-1

A Nafion film which was not subjected to a roughening treatment is defined as a cation exchange film of Comparative Example 4-1.

1. Observation of Surface Morphology

The surface morphology of the cation exchange film in each of Examples 4-1 to 4-6 and Comparative Example 4-1 was observed under the following conditions, and the roughness factor, the arithmetic mean roughness Ra and the maximum height roughness Rz were calculated.

Measuring equipment: Ultra-Deep Shape Measurement Microscope VK-8500 (Manufactured by KEYENCE CORPORATION)

Measurement range: $1.04 \times 10^{-3}$ cm$^2$

Shape analysis application: VK-H1A9 (Manufactured by KEYENCE CORPORATION)

2. Interface Resistance Measurement

[2-1. Impregnation Treatment of Cation Exchange Film]

The cation exchange film in each of Examples 4-1 to 4-6 and Comparative Example 4-1 was immersed in a water/alcohol solution of 1 mol/l of lithium hydroxide, and stirred at 80° C. for 12 hours to exchange protons in the cation exchange film with lithium ions. The cation exchange film in each of examples and comparative examples after stirring was washed with deionized water, and dried under a degassed atmosphere at 120° C. to remove lithium hydroxide and the solvent.

The resulting Li$^+$-type cation exchange film was subjected to an impregnation treatment by immersing the film under an environment at 25° C. for 12 hours in a solution obtained by mixing 1,2-dimethoxyethane (DME) and 1,3-dioxolane (DOL) at a volume ratio of 50:50. Through the treatment, the cation exchange film after the impregnation treatment was impregnated with 20% by mass of a nonaqueous solvent based on the mass of the cation exchange film before the impregnation treatment. The thicknesses of the cation exchange film before and after the impregnation treatment were 50 μm and 64 μm, respectively.

[2-2. Measurement of Electrolyte Layer Resistance R]

A resistance measurement cell 40 was prepared using as a cation exchange resin layer the cation exchange film in each of examples and comparative examples after the impregnation treatment, and using an electrochemical measurement cell 41 (manufactured by Nippon Tom Cell, Ltd.) as shown in FIG. 6. As a porous film 46, a 25 μm-thick polyethylene microporous film impregnated with a nonaqueous electrolyte containing 0.3 mol/l of LiTFSI, and a mixture of DME and DOL at a ratio of 50:50 (volume ratio) was used. As a cation exchange resin layer 45, the film impregnated with a mixed solvent of DME and DOL (volume ratio: 50:50) was used.

Using the resistance measurement cell, electrolyte layer resistance R was measured by a.c. impedance measurement. The a.c. impedance measurement was performed at an applied voltage amplitude of 5 mV and a frequency of 1 MHz to 100 mHz. A Nyquist diagram of measurement results was prepared, and fitting was performed using an equivalent circuit. Among the intersections of a real axis and a curve obtained by fitting a circular arc appearing on the highest frequency side, the value of an interaction on the low frequency side was read, and defined as electrolyte resistance R. The electrolyte layer resistance R includes porous layer resistance Re that is the resistance of the polyethylene microporous film; interface resistance Ri that is the resistance of the interface between the polyethylene microporous film and the cation exchange film after the impregnation treatment; and cation exchange resin layer resistance Re that is the resistance of the cation exchange film after the impregnation treatment. The electrolyte layer resistance R is expressed by the following formula (2).

$$R = 2Re + 2Ri + Rc \qquad (2)$$

[2-3. Measurement of Cation Exchange Resin Layer Resistance Re]

Except that a polyethylene microporous film impregnated with a nonaqueous electrolyte of DME and DOL (50:50 (volume ratio)) containing 0.3 mol/l of LiTFSI was not disposed, the same procedure as in the section [2-2. Measurement of Electrolyte Layer Resistance R] was carried out to perform a.c. impedance measurement. The resistance determined by the measurement was defined as cation exchange resin layer resistance Re.

[2-4. Measurement of Porous Layer Resistance Re]

Except that a polyethylene microporous film impregnated with a nonaqueous electrolyte of DME and DOL (50:50 (volume ratio)) containing 0.3 mol/l of LiTFSI was disposed in place of the cation exchange film after the impregnation treatment, the same procedure as in the section [2-3. Measurement of Cation Exchange Resin Layer Resistance Rc] was carried out to perform a.c. impedance measurement. The resistance determined by the measurement was defined as porous layer resistance Re.

From the values of electrolyte layer resistance R, cation exchange resin layer resistance Re and porous layer resistance Re each determined by a.c. impedance measurement, interface resistance Ri was calculated using the formula (1).

The concentration of LiTFSI in the nonaqueous electrolyte impregnated into the polyethylene microporous film was changed to a value as shown in Table 7, a.c. impedance measurement was performed using the cation exchange film in each of examples and comparative examples after the impregnation treatment, and interface resistance Ri was calculated. When the concentration of LiTFSI was 0.5 mol/l, measurement was performed only in Examples 4-1 to 4-3 and Comparative Example 4-1.

For the cation exchange films of Example 4-2 and Comparative Example 4-1, the sulfur equivalent concentration of lithium polysulfide in the nonaqueous electrolyte impregnated into the polyethylene microporous film was set to 3.0 mol/l, and the concentration of LiTFSI was changed to a value as shown in Table 8, a.c. impedance measurement was performed, and interface resistance Ri was calculated.

The nonaqueous electrolyte containing lithium polysulfide was prepared in the following manner. In a nonaqueous solvent obtained by mixing DME and DOL at a volume ratio of 50:50, lithium polysulfide (Li$_2$S) and sulfur (S$_8$) were added at a stoichiometric ratio (molar ratio of 8:5) allowing Li$_2$S$_6$ to be generated, in a glove box at a dew point of −80° C. or lower, and the mixture was stirred. The resulting solution was encapsulated in a closed container, and left standing in a thermostatic bath at 80° C. for 4 days to react Li$_2$S and S$_8$, thereby preparing a solution containing lithium polysulfide. In the lithium polysulfide solution, lithium polysulfide is dissolved in a sulfur equivalent concentration of 3.0 mol/l. LiTFSI was dissolved in this solution in such a manner that the concentration of LiTFSI was 0, 0.3, 0.5 or 1.0 mol/l, thereby preparing a nonaqueous electrolyte containing lithium polysulfide.

Figure 9:
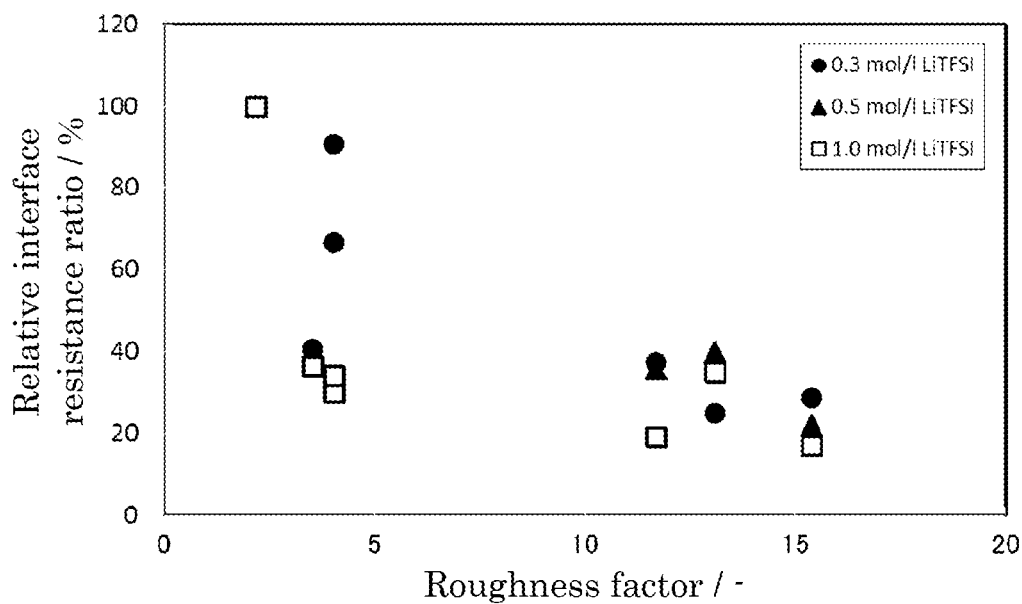
FIG. 9 is a graph showing a relationship between an interface resistance reduction ratio and a roughness factor of a surface of a cation exchange resin layer in the fourth example.
Figure 10:
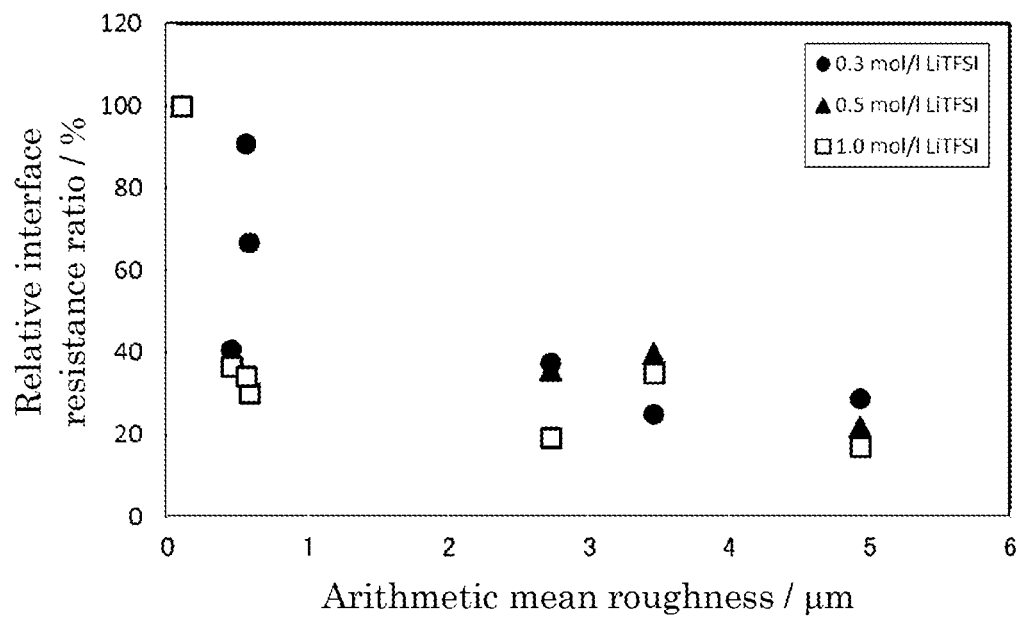
FIG. 10 is a graph showing a relationship between an interface resistance reduction ratio and an arithmetic mean roughness of a surface of a cation exchange resin layer in the fourth example.
Figure 11:
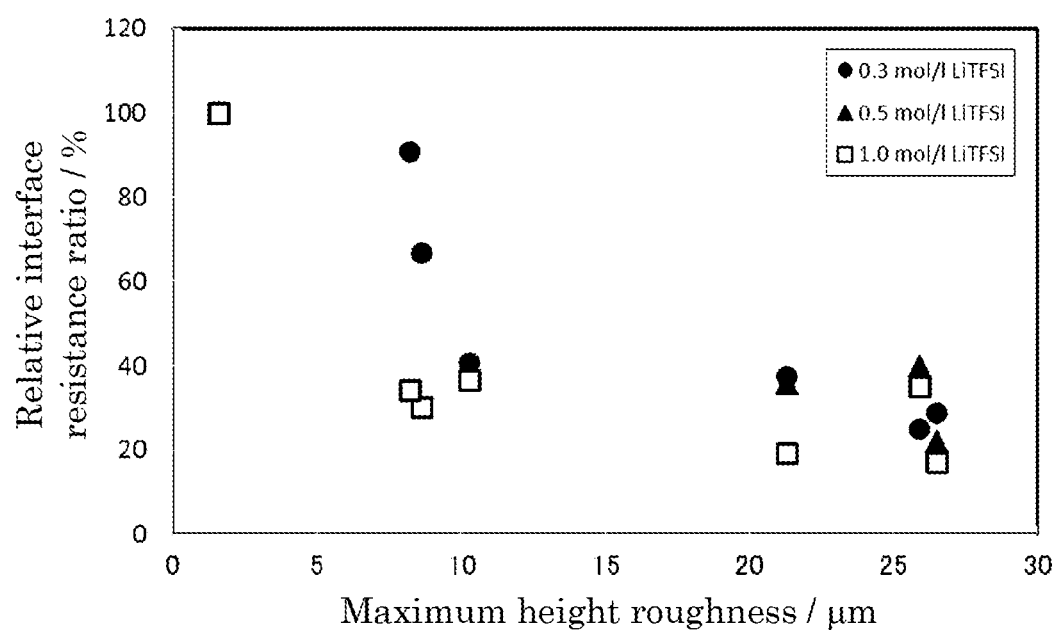
FIG. 11 is a graph showing a relationship between an interface resistance reduction ratio and a maximum height roughness of a surface of a cation exchange resin layer in the fourth example.

For the cation exchange films in examples and comparative examples, the roughness factor, the arithmetic mean roughness Ra and the maximum height roughness Rz are shown in Table 6, and interface resistance Ri between the cation exchange film after the impregnation treatment and each of polyethylene microporous films containing a nonaqueous electrolyte and having different concentrations of LiTFSI and lithium polysulfide is shown in Tables 7 and 8. Graphs obtained by dividing the interface resistance value in each of Examples 4-1 to 4-6 by the interface resistance value in Comparative Example 4-1 to calculate a relative interface resistance ratio (%), and plotting the relative interface resistance ratio (%) against the roughness factor, the arithmetic mean roughness Ra and the maximum height roughness Rz are shown in FIGS. 9 to 11.

TABLE 6

|  | Surface area per unit area/ m2/m2 | Arithmetic mean roughness Ra/ μm | Maximum height roughness Rz/ μm |
|---|---|---|---|
| Comparative Example 4-1 | 2.18 | 0.10 | 1.61 |
| Example 4-1 | 15.4 | 4.93 | 26.5 |
| Example 4-2 | 13.1 | 3.46 | 25.9 |
| Example 4-3 | 11.7 | 2.73 | 21.3 |
| Example 4-4 | 3.54 | 0.46 | 10.3 |
| Example 4-5 | 4.03 | 0.59 | 8.63 |
| Example 4-6 | 4.04 | 0.56 | 8.23 |

TABLE 7

|  | Li salt concentration | | |
|---|---|---|---|
|  | 0.3 mol/l | 0.5 mol/l | 1.0 mol/l |
| Comparative Example 4-1 | 63.8 | 92.7 | 490 |
| Example 4-1 | 18.3 | 20.5 | 83.3 |
| Example 4-2 | 15.9 | 37.0 | 171 |
| Example 4-3 | 23.8 | 33.3 | 95.0 |
| Example 4-4 | 25.9 | — | 180 |
| Example 4-5 | 42.5 | — | 148 |
| Example 4-6 | 58.0 | — | 168 |

TABLE 8

|  | Li salt concentration | | | |
|---|---|---|---|---|
|  | 0 mol/l | 0.3 mol/l | 0.5 mol/l | 1.0 mol/l |
| Comparative Example 4-1 | 50.8 | 64.0 | 158 | 494 |
| Example 4-2 | 32.3 | 43.5 | 104 | 319 |

It was found that by performing a roughening treatment with a sandpaper, all of the roughness factor, the arithmetic mean roughness Ra and the maximum height roughness Rz were increased as shown in Table 6. Incidentally, it was revealed that regardless of the concentration of LiTFSI or the presence/absence of lithium polysulfide, the cation exchange film in each of Examples 4-1 to 4-6, which was subjected to a roughening treatment, had lower interface resistance Ri as compared to the cation exchange film in Comparative Example 4-1, which was not subjected to a roughening treatment, as shown in Tables 7 and 8 and FIGS. 9 to 11. Further, when the concentration of LiTFSI was as low as 0.3 mol/l, Examples 4-1 to 4-4 in which the maximum height roughness of the surface of the cation exchange film was 10 μm or more showed lower interface resistance as compared to Examples 4-5 and 4-6 in which the maximum height roughness was less than 10 μm. Incidentally, when the concentration of LiTFSI was as high as 1.0 mol/l, Examples 4-1 to 4-3 and Examples 4-5 and 4-6 in which the arithmetic mean roughness Ra was 0.5 μm or more showed lower interface resistance as compared to Example 4-4 in which the arithmetic mean roughness Ra was less than 0.5 μm.

It was found that even when lithium polysulfide was contained, interface resistance was reduced by roughening the surface of the cation exchange film as shown in Table 8.

3. High Rate Discharge Test

Example 5-1

Magnesium citrate was subjected to a carbonization treatment at 900° C. under an argon atmosphere for 1 hour, and then immersed in a 1 mol/l of sulfuric acid aqueous solution to extract MgO. Subsequently, the residue was washed and dried to obtain porous carbon. The porous carbon and sulfur were mixed at a mass ratio of 30:70. The mixture was encapsulated in a closed vessel under an argon atmosphere, heated to 150° C. at a temperature elevation rate of 5° C./min, held for 5 hours, and then allowed to cool to 80° C. Thereafter, the mixture was heated again to 300° C. at a temperature elevation rate of 5° C./min, and held for 2 hours to be heat-treated, thereby obtaining a carbon-sulfur composite (hereinafter, also referred to as a "SPC composite").

A positive composite paste containing a SPC composite as a positive active material, acetylene black as a conductive agent, and polyvinylidene fluoride (PVDF) as a binding agent at a mass ratio of 85:5:10 and having N-methylpyrrolidone (NMP) as a solvent was prepared. The resulting positive composite paste was filled into a nickel mesh current collector, and then dried to prepare a positive electrode. The coating amount of the positive composite paste was 1.2 mg/cm².

As a negative electrode plate, one obtained by attaching metallic Li to a 10 μm-thick copper foil so that the total thickness of the negative electrode was 310 μm was used.

As a cation exchange film, a Nafion film subjected to a roughening treatment only at one surface using a # P400 sandpaper was used.

As a positive electrode electrolyte, a solution containing lithium polysulfide with a sulfur equivalent concentration of 3.0 mol/l, and including a mixture of DME and DOL at a volume ratio of 50:50 was used.

As a negative electrode electrolyte, a solvent obtained by mixing DME and DOL at a volume ratio of 50:50 was used.

Figure 8:
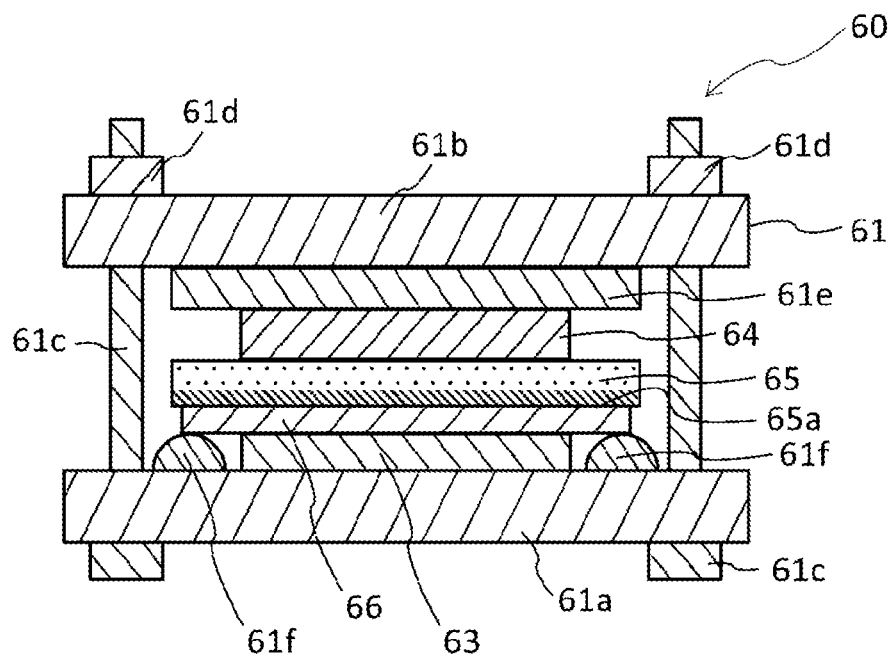
FIG. 8 is a schematic sectional view showing a configuration of a test cell used in a fourth example.

A test cell 60 was prepared using an electrochemical measurement cell 61 (manufactured by Nippon Tom Cell, Ltd.) as shown in FIG. 8. First, a positive electrode 63 prepared in the manner described above is disposed inside an O-ring 61f provided on a stainless steel plate support 61a and having an inner diameter of 26 mm and an outer diameter of 34 mm. A porous film (porous layer) 66 impregnated with a positive electrode electrolyte was laminated, and a cation exchange resin layer 65 having a size larger than the inner diameter of the O-ring was then disposed. Here, the cation exchange resin layer 65 was disposed in such a manner that a first surface 65a subjected to the roughening treatment was in contact with the porous film 66. A negative electrode 64 impregnated with a negative electrode electrolyte was laminated on the cation exchange resin layer 65. A stainless steel plate electrode 61e was disposed on the negative electrode 64, a stainless steel plate lid body 61b was superposed thereon, and the electrode 61e, the negative electrode 64 and the lid body 61b were fastened together with a bolt 61c and a nut 61d to form a test cell 60 (hereinafter, also referred to as a "battery"). The test cell 60 is defined as an example battery 5-1.

Comparative Example 5-1

Except that as a Nafion film which was not subjected to a roughening treatment was used as a cation exchange film, the same procedure as in Example 5-1 was carried out to prepare a test cell according to Comparative Example 5-1. The test cell is defined as a comparative example battery 5-1.

The 0.1 C discharge capacity and the 0.2 C discharge capacity of each of the example battery 5-1 and the comparative example battery 5-1 were measured by the following method, and the 0.2 C discharge capacity was divided by the 0.1 C discharge capacity to calculate a 0.2 C/0.1 C ratio (%).

0.1 C constant current discharge to 1.5 V and 0.1 C constant current charge to 3.0 V were performed at 25° C. As a condition for termination of charge and discharge, charge and discharge were terminated at the time of reaching a predetermined voltage or elapse of 10 hours. With the 0.1 C discharge and charge step as one cycle, the cycle was repeated three times. The value obtained by dividing the discharge capacity at the third cycle by the mass of the SPC composite was defined as a 0.1 C discharge capacity (mAh/g).

The value of 1 C was defined as a current value at which the capacity of a positive active material is discharged in an hour where the capacity per mass of SPC composite used as a positive active material is 1675 mAh/g that is a theoretical capacity.

Next, 0.2 C constant current discharge to 1.5 V and 0.2 C constant current charge to 3.0 V were performed at 25° C. As a condition for termination of charge and discharge, charge and discharge were terminated at the time of reaching a predetermined voltage or elapse of 5 hours. With the 0.2 C discharge and charge step as one cycle, the cycle was repeated three times. The value obtained by dividing the discharge capacity at the third cycle by the mass of the SPC composite was defined as a 0.2 C discharge capacity (mAh/g). The 0.2 C discharge capacity was divided by the 0.1 C discharge capacity to calculate a 0.2 C/0.1 C ratio (%).

Figure 12:
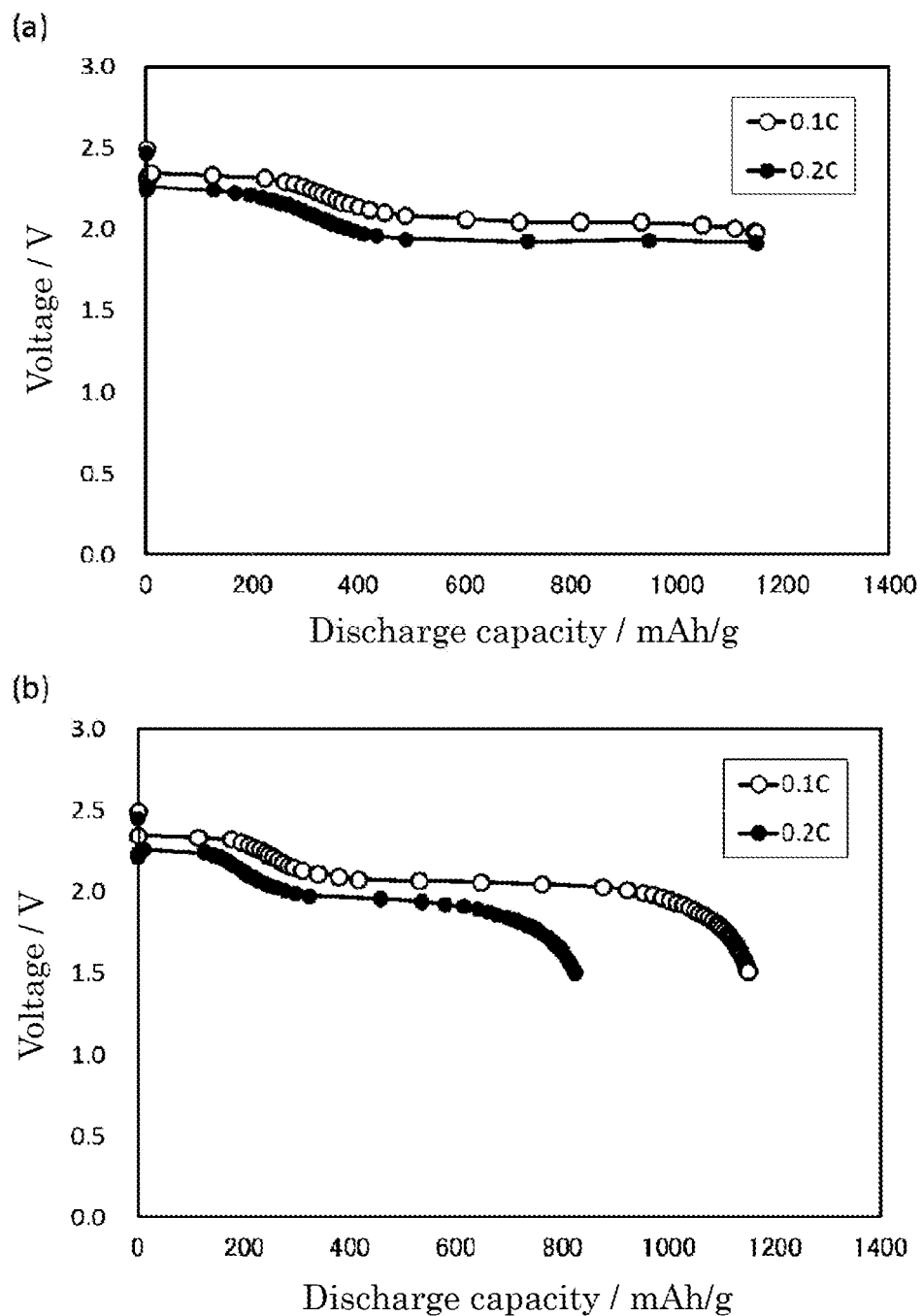
FIG. 12(a) is a view showing a discharge curve of an example battery 5-1 in the fourth example.
FIG. 12(b) is a view showing a discharge curve of a comparative example battery 5-1 in the fourth example.

The 0.1 C discharge capacities, 0.2 C discharge capacities and 0.2 C/0.1 C ratios (%) of the example battery 5-1 and the comparative example battery 5-1 are shown in Table 9. The 0.1 C and 0.2 C discharge curves of the example battery 5-1 and the comparative example battery 5-1 are shown in FIG. 12.

TABLE 9

| | 0.1 C Discharge capacity/ mAh/g | 0.2 C Discharge capacity/ mAh/g | 0.2 C/0.1 C ratio/ % |
|---|---|---|---|
| Example battery 5-1 | 1150 | 1150 | 100 |
| Comparative example battery 5-1 | 1150 | 824 | 71.7 |

The example battery 5-1 exhibited a high discharge capacity of 1150 mAh/g at both of discharge currents of 0.1 C and 0.2 C, and had a 0.2 C/0.1 C ratio of 100%. On the other hand, the comparative example battery 5-1 had a 0.1 C discharge capacity comparable to that in the example battery 5-1, but had a low 0.2 C discharge capacity, and a 0.2 C/0.1 C ratio of 71.7%. This may be because in the example battery 5-1, a cation exchange film with a surface subjected to a roughening treatment was used as a cation exchange resin layer, and therefore interface resistance decreased, leading to improvement of high rate discharge performance.

In the example battery 5-1, as shown in FIG. 12(a), the discharge potential did not decrease even after discharge of a capacity of 1150 mAh/g which corresponds to the capacity of sulfur in the positive active material layer. Meanwhile, in the comparative example battery 5-1, a phenomenon was observed in which the discharge potential decreased at the end of discharge as shown in FIG. 12(b). This may be because due to a decrease in interface resistance of the cation exchange resin layer by the roughening treatment, the positive electrode surface had a more uniform current distribution. Incidentally, it is considered that retainability of lithium polysulfide on the positive electrode surface was improved by the roughening treatment, resulting in enhancement of contribution of lithium polysulfide contained in the positive electrode nonaqueous electrolyte to the charge-discharge reaction.

INDUSTRIAL APPLICABILITY

The present invention can be applied to nonaqueous electrolyte energy storage devices including nonaqueous field secondary batteries to be used as power sources for electronic devices such as personal computers and communication terminals, and automobiles, and the like, and negative electrodes provided in the nonaqueous electrolyte energy storage devices.

DESCRIPTION OF REFERENCE SIGNS

1: Nonaqueous electrolyte secondary battery
2: Electrode group
3: Battery container
4: Positive electrode terminal
4': Positive electrode lead
5: Negative electrode terminal
5': Negative electrode lead
11, 21, 33, 53, 63: Positive electrode
12, 22: Positive electrode electrolyte
13, 23, 34, 54, 64: Negative electrode
14, 24: Negative electrode electrolyte
15, 25a, 35, 45, 55, 65: Cation exchange resin layer
20: Energy storage unit
25: Separator
25b, 46, 56a, 56b, 66: Porous film (porous layer)
25c, 65a: First surface
25d: Second surface
30, 50, 60: Test cell
31, 41, 51, 61: Electrochemical measurement cell
31a, 41a, 51a, 61a: Support
31b, 41b, 51b, 61b: Lid body
31c, 41c, 51c, 61c: Bolt
31d, 41d, 51d, 61d: Nut
31e, 41e, 51e, 61e: Electrode
31f, 41f, 51f, 61f: O-ring
40: Resistance measurement cell
100: Energy storage apparatus

The invention claimed is:

1. A nonaqueous electrolyte secondary battery comprising:
   a sulfur-containing positive electrode;
   a negative electrode;
   a cation exchange resin layer interposed between the sulfur-containing positive electrode and the negative electrode;
   a positive electrode electrolyte; and
   a negative electrode electrolyte,
   wherein the positive electrode electrolyte contains lithium polysulfide, and a sulfur equivalent concentration of the positive electrode electrolyte is higher than a sulfur equivalent concentration of the negative electrode electrolyte, and wherein the sulfur equivalent concentration of the positive electrode electrolyte is 1.2 mol/l or more.

2. The nonaqueous electrolyte secondary battery according to claim 1, wherein the sulfur equivalent concentration of the positive electrode electrolyte is 3.0 mol/l or more.

3. The nonaqueous electrolyte secondary battery according to claim 1, wherein the sulfur equivalent concentration of the positive electrode electrolyte is 18 mol/l or less.

4. The nonaqueous electrolyte secondary battery according to claim 1, wherein a concentration of an anion contained in at least one of the positive electrode electrolyte or the negative electrode electrolyte is 0.7 mol/l or less.

5. The nonaqueous electrolyte secondary battery according to claim 1, wherein a concentration of an anion contained in the positive electrode electrolyte is 0.3 mol/l or less.

6. The nonaqueous electrolyte secondary battery according to claim 1, wherein the cation exchange resin layer has a first surface having a roughness factor of 3 or more.

7. The nonaqueous electrolyte secondary battery according to claim 6, wherein the first surface of the cation exchange resin layer has an arithmetic mean roughness Ra of 0.5 μm or more.

8. The nonaqueous electrolyte secondary battery according to claim 6, wherein the first surface of the cation exchange resin layer has a maximum height roughness Rz of 0.5 μm or more.

9. The nonaqueous electrolyte secondary battery according to claim 6, further comprising a porous layer, the porous layer being in contact with the first surface of the cation exchange resin layer.

10. A method for producing a nonaqueous electrolyte secondary battery including a sulfur-containing positive electrode, a negative electrode, and a cation exchange resin layer interposed between the sulfur-containing positive electrode and the negative electrode, the method comprising:
    injecting a lithium polysulfide-containing positive electrode electrolyte between the sulfur-containing positive electrode and the cation exchange resin layer; and
    injecting a negative electrode electrolyte, which has a lithium polysulfide concentration lower than that of the positive electrode electrolyte, between the negative electrode and the cation exchange resin layer.

11. The nonaqueous electrolyte secondary battery according to claim 1, wherein the sulfur equivalent concentration of the positive electrode electrolyte is 1.5 mol/l or more.

* * * * *